United States Patent
Suzuki et al.

(10) Patent No.: US 8,095,289 B2
(45) Date of Patent: Jan. 10, 2012

(54) NEGATIVE PRESSURE CONTROL APPARATUS FOR VEHICLE BRAKING OPERATION

(75) Inventors: Hideki Suzuki, Chita-gun (JP);
Kazuhiro Hayashi, Nishikamo-gun (JP);
Makoto Otsubo, Anjo (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 1110 days.

(21) Appl. No.: 11/925,479

(22) Filed: Oct. 26, 2007

(65) Prior Publication Data

US 2008/0103667 A1 May 1, 2008

(30) Foreign Application Priority Data

Oct. 27, 2006 (JP) .................................. 2006-292062

(51) Int. Cl.
*B60T 17/04* (2006.01)
*F02M 35/10* (2006.01)

(52) U.S. Cl. ............... 701/70; 123/184.21; 123/543; 123/572

(58) Field of Classification Search .................. None
See application file for complete search history.

(56) References Cited

U.S. PATENT DOCUMENTS

| | | | |
|---|---|---|---|
| 4,557,226 A | 12/1985 | Mayer et al. | |
| 5,910,098 A * | 6/1999 | Harima | 60/397 |
| 6,006,716 A | 12/1999 | Harada et al. | |
| 6,220,271 B1 * | 4/2001 | Emmerich et al. | 137/113 |
| 6,283,559 B1 | 9/2001 | Yamada et al. | |
| 6,321,716 B1 | 11/2001 | Mashiki et al. | |
| 6,345,869 B1 | 2/2002 | Matsuo et al. | |
| 6,398,316 B1 | 6/2002 | Mizutani et al. | |

(Continued)

FOREIGN PATENT DOCUMENTS

JP 01-151764 6/1989

(Continued)

OTHER PUBLICATIONS

Japanese Office Action dated Feb. 2, 2011, issued in corresponding Japanese Application No. 2006-292062, with English translation.

(Continued)

*Primary Examiner* — Paul N Dickson
*Assistant Examiner* — Wesley Potter
(74) *Attorney, Agent, or Firm* — Nixon & Vanderhye PC

(57) ABSTRACT

A communication passage for generating braking negative pressure is connected to an air passage for respective cylinders at a downstream side of a throttle valve. An air ejector is provided in a negative pressure pipe, to which communication passages for the respective cylinders are converged. A negative pressure passage for a brake booster is connected to the air ejector at a side of suction gas via a check valve. A passage for PCV gas and an intake air branched passage for bifurcating a part of the intake air from a surge tank at an upstream side of the throttle valve are connected to a driving gas side of the air ejector, wherein a negative pressure control valve is provided in the intake air branched passage. The PCV gas and the part of the intake air are forced to flow into the driving gas side of the air ejector, so that the air ejector functions as a vacuum pump. As a result, the braking negative pressure for the brake booster can be surely reduced to a target negative pressure.

10 Claims, 17 Drawing Sheets

U.S. PATENT DOCUMENTS

| | | | |
|---|---|---|---|
| 2004/0182363 A1* | 9/2004 | Suzuki | 123/339.11 |
| 2007/0234716 A1* | 10/2007 | Hirooka | 60/397 |
| 2007/0284937 A1* | 12/2007 | Deiml et al. | 303/115.3 |
| 2007/0295303 A1* | 12/2007 | Hirooka | 123/339.23 |
| 2008/0232975 A1* | 9/2008 | Hanai et al. | 417/15 |
| 2009/0132149 A1* | 5/2009 | Hirooka | 701/103 |
| 2010/0004844 A1* | 1/2010 | Hirooka | 701/102 |

FOREIGN PATENT DOCUMENTS

| | | |
|---|---|---|
| JP | 07-279640 | 10/1995 |
| JP | 10-220310 | 8/1998 |
| JP | 2000-038966 | 2/2000 |
| JP | 2005-264874 | 9/2005 |
| JP | 2005-344606 | 12/2005 |

OTHER PUBLICATIONS

Indian Office Action dated Feb. 28, 2011, issued in corresponding Indian Application No. 2443/CHE/2007.

Chinese Office Action dated Jun. 5, 2009, issued in corresponding Japanese Application No. 200710167930.6, with English translation.

* cited by examiner

FIG. 11

MAP FOR BASIC DUTY FOR NEGATIVE PRESSURE CONTROL VALVE

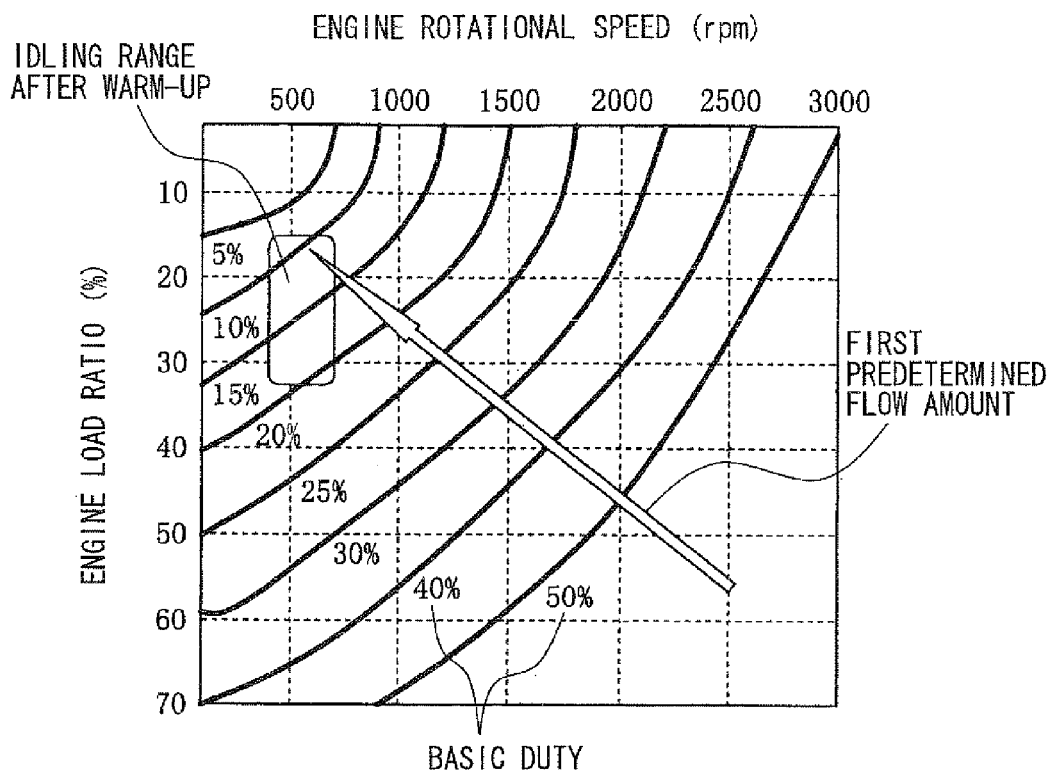

FIG. 12

MAP FOR NEGATIVE PRESSURE CORRECTING COEFFICIENT

|   |   | | FIRST PREDETERMINED NEGATIVE PRESSURE "PB1" | | SECOND PREDETERMINED NEGATIVE PRESSURE "PB2" | |
|---|---|---|---|---|---|---|
| | BRAKING NEGATIVE PRESSURE (mmHg) | −100 | −250 | −252 | −300 | −302 |
| (a) | NEGATIVE PRESSURE CORRECTING COEFFICIENT IN CASE OF BRAKING NEGATIVE PRESSURE HIGHER THAN "PB1" | 2.0 | 1.1 | 0 | 0 | 0 |
| (b) | NEGATIVE PRESSURE CORRECTING COEFFICIENT IN OTHER CASES THAN THE ABOVE (a) | 2.0 | 1.1 | 1.1 | 1.0 | 0 |

FIG. 13

MAP FOR OIL TEMPERATURE CORRECTING DUTY

| OIL TEMPERATURE (°C) | −30 | −10 | 0 | 25 | 70 |
|---|---|---|---|---|---|
| OIL TEMPERATURE CORRECTING DUTY (%) | 20 | 12 | 9 | 4 | 0 |

SECOND PREDETERMINED FLOW AMOUNT

FIG. 14

MAP FOR AMBIENT TEMPERATURE CORRECTING DUTY

| | ENGINE ROTATIONAL SPEED (rpm) | 700 | 900 | 1200 | 2000 | 2500 |
|---|---|---|---|---|---|---|
| (a) | AMBIENT TEMPERATURE CORRECTING DUTY BEFORE COMPLETE ENGINE WARM-UP | 0 | 4 | 10 | 16 | 20 |
| (b) | AMBIENT TEMPERATURE CORRECTING DUTY AFTER COMPLETE ENGINE WARM-UP | 0 | 2 | 4 | 7 | 12 |

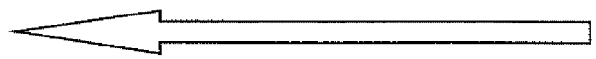

THIRD PREDETERMINED FLOW AMOUNT

FIG. 19

MAP FOR BASIC DUTY FOR NEGATIVE PRESSURE CONTROL VALVE

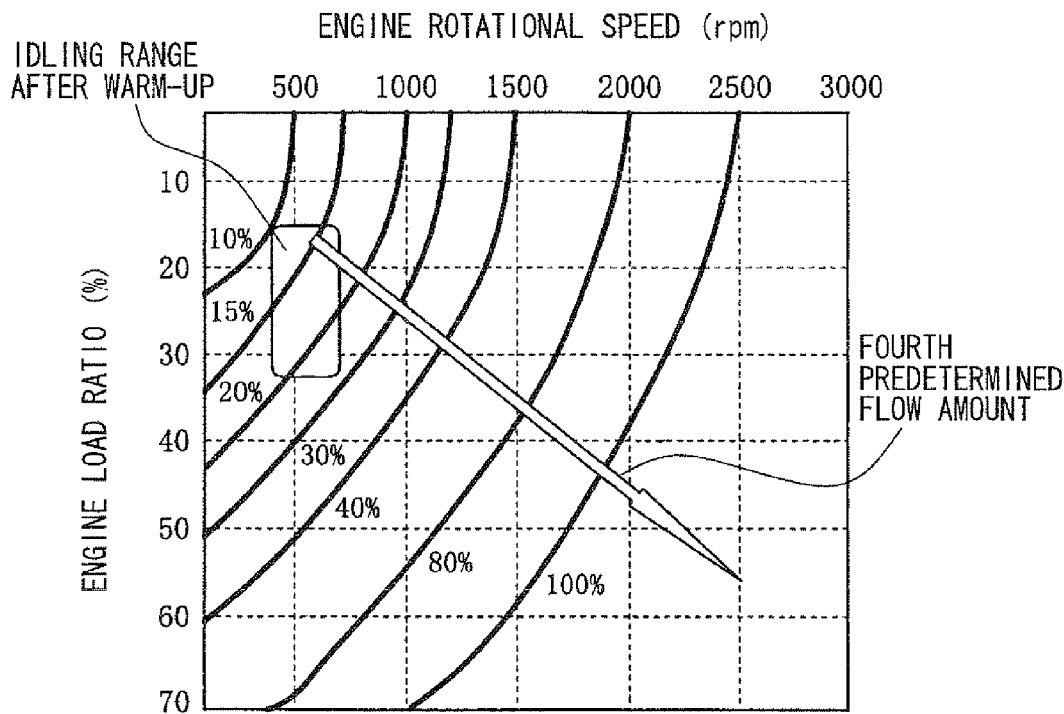

FIG. 20

MAP FOR NEGATIVE PRESSURE CORRECTING COEFFICIENT

|  |  | BRAKING NEGATIVE PRESSURE (mmHg) | −100 | FIRST PREDETERMINED NEGATIVE PRESSURE "PB1" −250 | −252 | SECOND PREDETERMINED NEGATIVE PRESSURE "PB2" −300 | −302 |
|---|---|---|---|---|---|---|---|
| (a) | | NEGATIVE PRESSURE CORRECTING COEFFICIENT IN CASE OF BRAKING NEGATIVE PRESSURE HIGHER THAN "PB1" | 1.2 | 1.0 | 0 | 0 | 0 |
| (b) | | NEGATIVE PRESSURE CORRECTING COEFFICIENT IN OTHER CASES THAN THE ABOVE (a) | 1.2 | 1.0 | 1.0 | 1.0 | 0 |

NEGATIVE PRESSURE CONTROL APPARATUS FOR VEHICLE BRAKING OPERATION

CROSS REFERENCE TO RELATED APPLICATION

This application is based on Japanese Patent Application No. 2006-292062 filed on Oct. 27, 2006, the disclosure of which is incorporated herein by reference.

FIELD OF THE INVENTION

The present invention relates to a negative pressure control apparatus for a vehicle braking operation, in which a throttle valve for controlling intake air amount is provided in each of branched intake air passages for supplying the intake air to respective engine cylinders.

BACKGROUND OF THE INVENTION

Recently, as disclosed in Japanese Patent Publication No. 2005-344606, throttle valves are provided in branched intake air passages (intake manifolds) for respective cylinders of an engine, so as to respectively control the intake air amount. In addition, a communication chamber is provided to communicate the intake air passages with each other at respective downstream sides of the throttle valves. A nipple for negative pressure is provided at the communication chamber, and the intake negative pressure is applied from the nipple to a brake booster, so that the negative pressure for the braking operation is obtained.

In the above throttle system (the multiple-valve type throttle system), in which throttle valves are provided for the respective cylinders, intake air pressure largely varies at a downstream side of the throttle valve in each stroke (a suction stroke, a compression stroke, a combustion stroke, and an exhaust stroke), because a volume of the intake air passage is small at the downstream side of the throttle valve. A time period, during which intake negative pressure necessary for a braking operation can be obtained, is limited to such a period during which each of the engine cylinder is around BDC (bottom dead center) of the suction stroke. The time period for obtaining the intake negative pressure necessary for a braking operation is shorter than that for a general throttle system, in which a single throttle valve is provided at an upstream side of a surge tank to control the intake air amount. Therefore, it is disadvantageous in the multiple-valve type throttle system, in that it is not easy to obtain negative pressure required for a braking operation.

In particular, an engine is recently equipped with a PCV system (a positive crankcase ventilation system), an evaporated fuel gas treatment system (a fuel vapor treatment system) or the like, in order to reduce emission amount of HC into the air. According to such system, the crankcase ventilation gas or the evaporated fuel gas is introduced into the intake pipe at the downstream side of the throttle valve. Therefore, in the multiple-valve type throttle system having the small volume for the intake air passages at the downstream side of the throttle valve, the intake air pressure at the downstream side of the throttle valve is likely to increase by the introduction of the crankcase ventilation gas (the PCV gas) or the evaporated fuel gas, not only when the throttle valve is opened but also when the throttle valve is close to its fully closed position. As above, in the multiple-valve type throttle system, it is a problem that the negative pressure for the braking operation can not be easily obtained.

SUMMARY

The present exemplary embodiment is made in view of the foregoing problems, and has an object to provide a negative pressure control apparatus for a vehicle braking operation, in which the negative pressure for the braking operation can be obtained in the multiple-valve type throttle system.

According to a feature of the present invention, a control apparatus of a braking negative pressure for an engine has a main intake air passage, which is branched into intake manifolds for supplying intake air into respective cylinders, and a throttle valve provided in each of the intake manifolds for respectively controlling intake air amount. In the control apparatus for the braking-negative pressure, a communication passage is connected to each of the intake manifolds at a downstream side of the throttle valve, in order to generate a negative pressure for a braking negative pressure for a brake booster, a negative pressure control valve is provided in a negative pressure pipe, to which the communication passages for the respective cylinders are converged, and a negative pressure control means for operating the negative pressure control valve and thereby controlling the braking negative pressure of the brake booster in accordance with operational condition of the engine.

According to the control apparatus for the braking negative pressure, the negative pressure control valve is operated in accordance with the operational condition of the engine, so that the braking negative pressure can be decreased to a target negative pressure (increase of the negative pressure) or the decreased negative pressure can be maintained. As a result, stable braking performance can be assured.

According to another feature of the present invention, an air ejector is provided in the negative pressure pipe, to which the communication passages for the respective cylinders are converged, a negative pressure passage for the brake booster is connected to the air ejector at a side of its suction gas, via a check valve, a gas passage for crankcase ventilating gas is connected to the air ejector at a side of driving gas, an intake air branched passage is connected to the air ejector at the side of driving gas for distributing a part of the intake air in the main intake air passage at an upstream side of the throttle valve, and the negative pressure control valve is provided in the intake air branched passage.

According to a further feature of the present invention, the communication passage is connected to an air passage of the intake manifold adjacent to a back surface of the throttle valve on a side of an intake port, at which no air flow is generated when the throttle valve is slightly opened, and an open end of the communication passage is directed to the throttle valve.

According to such an arrangement, the gas and air can be sprayed from the open end of the communication passage toward the back surface of the throttle valve. The fuel attached to the back surface of the throttle valve is blown away by such sprayed gas and air. As a result, most of the fuel blown back to the throttle valve by the backflow of the tumble air flow may not be attached to the back surface of the throttle valve.

According to a still further feature of the present invention, a heater is provided for heating the back surface of the throttle valve and an inner surface of the air passage at which no air flow is generated when the throttle valve is slightly opened.

According to a still further feature of the present invention, the heater is provided at the back surface of the throttle valve.

According to a still further feature of the present invention, the control apparatus for the braking negative pressure has an ambient temperature detecting sensor for detecting ambient temperature, and a heater control unit for supplying electric current to the heater during a period from a time point at which an engine operation starts to a time point at which the engine is warmed-up, when the ambient temperature detected by the ambient temperature detecting sensor is lower than a predetermined temperature.

In the above control apparatus, the heater control unit supplies the electric current to the heater during a period from a time point of a vehicle deceleration to a time point of an engine idling operation, even when the engine is warmed-up.

According to a still further feature of the present invention, it is more preferable in the above case, to control amount of intake air flowing through the negative pressure control valve in accordance with the operational condition of the engine, during a period in which the electric current is supplied to the heater (the third predetermined flow amount).

According to a still further feature of the present invention, it may be also possible, to provide an intake air amount control means for decreasing an amount of the intake air passing through the throttle valve by such an amount, which corresponds to an amount of the air flowing through the negative pressure control valve. In such an arrangement, the negative pressure control means increases the amount of the air flowing through the negative pressure control valve to a first predetermined flow amount, which is defined by the operational condition of the engine, when the braking negative pressure of the brake booster is changed from a first predetermined negative pressure to a side of the atmospheric pressure. Furthermore, the negative pressure control means cuts off the flow of the air flowing through the negative pressure control valve, when the braking negative pressure of the brake booster recovers to its second predetermined negative pressure, which is lower than the first predetermined negative pressure.

According to a still further feature of the present invention, it is more preferable, to decrease the first predetermined flow amount more, as a rotational speed of the engine is lower and/or an engine load is smaller.

According to a still further feature of the present invention, it is also possible, to control the amount of the air flowing through the negative pressure control valve at a second predetermined flow amount, which is defined by a temperature of the engine (for example, oil temperature or temperature of engine cooling water), when the engine is not yet completely warmed-up even in the case that the braking negative pressure of the brake booster becomes lower than the second predetermined negative pressure.

According to a still further feature of the present invention, the air ejector may be removed, but a negative pressure passage of the brake booster may be connected to the negative pressure pipe, to which the communication passages for the respective cylinders are converged, via the negative pressure control valve.

According to a still further feature of the present invention, the communication passage is connected to an air passage of the intake manifold adjacent to a back surface of the throttle valve on a side of an intake port, at which no air flow is generated when the throttle valve is slightly opened, and an open end of the communication passage is directed to the throttle valve.

According to a still further feature of the present invention, the amount of the air flowing through the negative pressure control valve is increased to a fourth predetermined flow amount, which is defined by the operational condition of the engine, when the braking negative pressure of the brake booster is changed from a first predetermined negative pressure to a side of the atmospheric pressure. And the flow of the air flowing through the negative pressure control valve is cut off, when the braking negative pressure of the brake booster recovers to its second predetermined negative pressure, which is lower than the first predetermined negative pressure.

According to a still further feature of the present invention, it is more preferable, to increase the fourth predetermined flow amount more, as a rotational speed of the engine is higher and/or an engine load is larger.

BRIEF DESCRIPTION OF THE DRAWINGS

The above and other objects, features and advantages of the present invention will become more apparent from the following detailed description made with reference to the accompanying drawings. In the drawings:

FIG. 11 is a conceptualistic graph showing a map for basic duty for the negative pressure control valve according to the first embodiment;

FIG. 12 is a conceptualistic table showing a map for negative pressure correcting coefficient according to the first embodiment;

FIG. 13 is a conceptualistic table showing a map for oil temperature correcting duty according to the first embodiment;

FIG. 14 is a conceptualistic table showing a map for ambient temperature correcting duty according to the first embodiment;

FIG. 19 is a conceptualistic graph showing a map for basic duty for the negative pressure control valve according to the second embodiment;

FIG. 20 is a conceptualistic table showing a map for negative pressure correcting coefficient according to the second embodiment.

DETAILED DESCRIPTION OF THE PREFERRED EMBODIMENTS

First Embodiment

Figure 1:
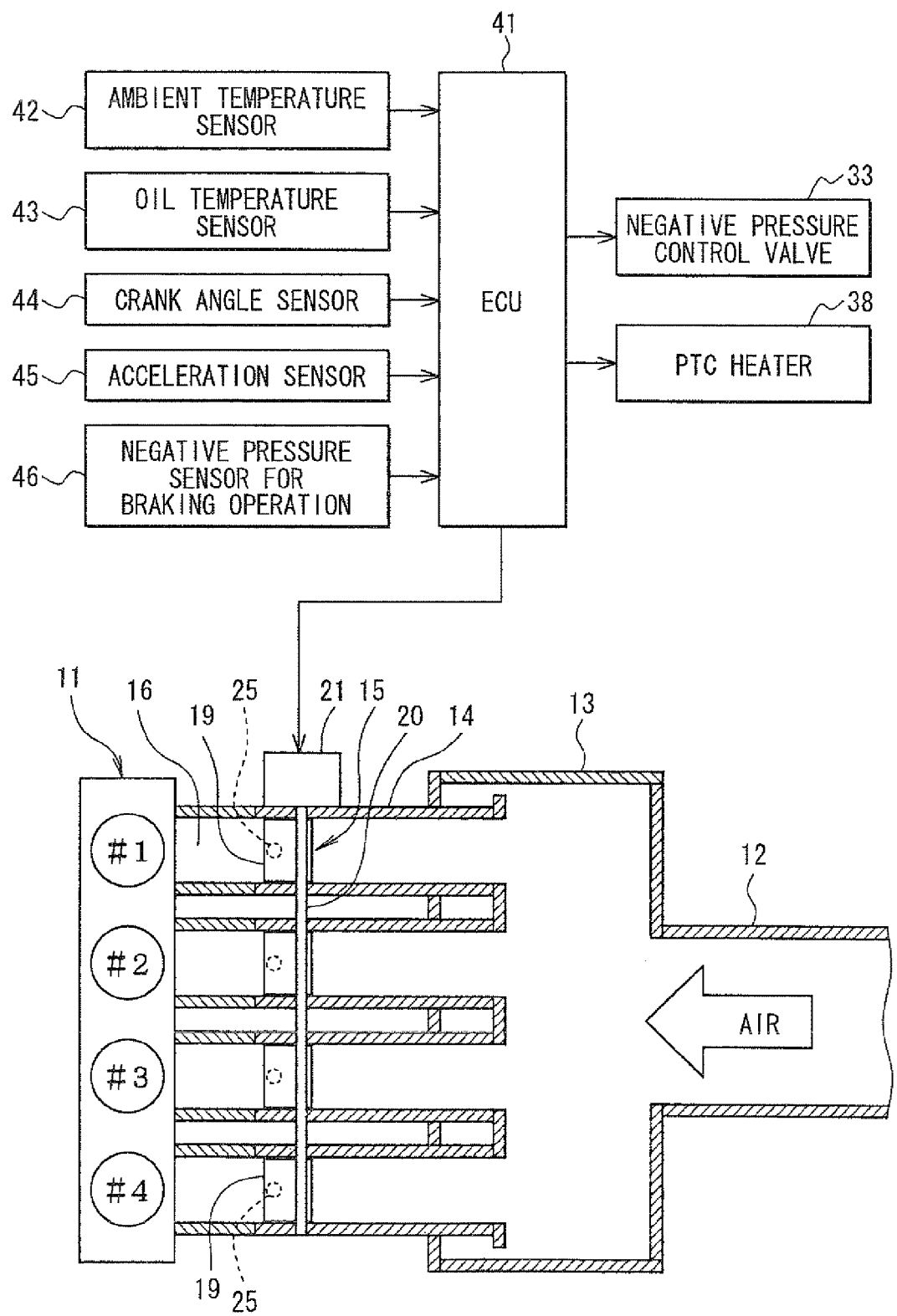
FIG. 1 is a schematic structure of an engine control system according to a first embodiment of the present invention.

A first embodiment of the present invention will be explained with reference to FIGS. 1 to 14.

A general structure of an engine intake system will be explained with reference to FIG. 1. An internal combustion engine 11, for example, an in-line four cylinder engine, has four cylinders, that are first to fourth cylinders #1 to #4. An air flow meter (not shown) is provided in an intake pipe 12 (a main intake air passage) of the engine 11, in order to detect intake air amount. A surge tank 13 is provided at a downstream side of the air flow meter. Intake manifolds (branched intake air passages) 14 are connected to the surge tank 13, to supply the intake air into respective cylinders of the engine 11. Throttle valve units 15 are provided in each of the intake manifolds 14, to control the intake air amount to be supplied to the respective cylinders. Fuel injection valves (not shown) are provided adjacent to an intake port 16 of the respective cylinders, to inject fuel into the intake port 16. Spark plugs (not shown) are provided in an engine cylinder head for the respective cylinders, so that air-fuel mixture in the cylinders may be ignited by spark discharges generated at the spark plugs.

A structure of the throttle valve unit 15 will be explained with reference to FIG. 2. In each of the intake manifolds 14, an air passage 18 having a cross section of a rectangular shape is formed by a housing 17 made of synthetic resin. A throttle valve 19 of a cantilever type is provided in the air passage 18 for opening and closing the air passage 18. The throttle valve 19 is pivoted at its lower end to a shaft 20. A shape of the throttle valve 19 is so designed to conform to the shape of the cross section of the air passage 18, for example, the rectangular shape in the embodiment. The shapes of the cross section of the air passage 18 and the throttle valve 19 are not limited to the rectangular shape, but any other shapes, such as, a semi-circular shape, a semi-elliptic shape, may be used.

Each of the throttle valves 19 are commonly linked to the shaft 20, so that the throttle valves 19 are integrally rotated. The shaft 20 is driven by an electric motor 21 (shown in FIG. 1), which is operated by an electronic control unit (ECU) 41 in accordance with an operational condition (e.g. an operated stroke amount of an acceleration pedal) of the engine.

The lower end of the throttle valve 19 is close to an inner surface of the housing 17, so that intake air may not pass through a gap between the lower end of the throttle valve 19 and the housing 17. When the throttle valve 19 is opened, a passage for intake air flow is formed only at an upper portion of the throttle valve 19 (a gap between the upper end of the throttle valve 19 and the inner surface of the housing 17), so that a tumble air flow is generated at a downstream side of the throttle valve 19 by the intake air flow passing over the upper end of the throttle valve 19. An area for the intake air flow at the upper end of the throttle valve 19 (that is, the intake air amount) is changed in accordance with an opening position of the throttle valve 19. A recess 22 is formed at the housing 17 and the intake manifold 14 neighboring to the housing 17, so that the throttle valve 19 is accommodated in the recess at its fully opened position in order not to stand in the way of the intake air flow.

A structure of a negative pressure control system for a vehicle braking operation will be explained.

Figure 2:
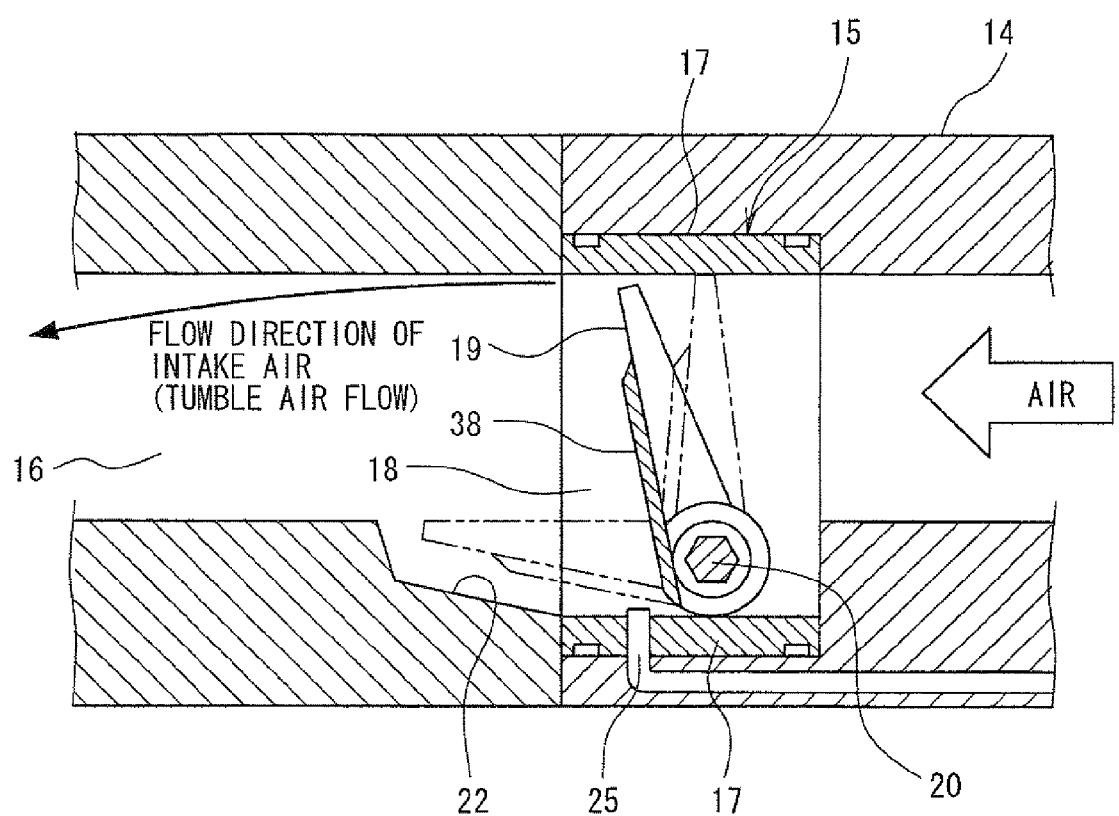
FIG. 2 is a vertical sectional view showing a structure of a throttle valve unit of a cantilever type and its related portions of the first embodiment.
Figure 3:
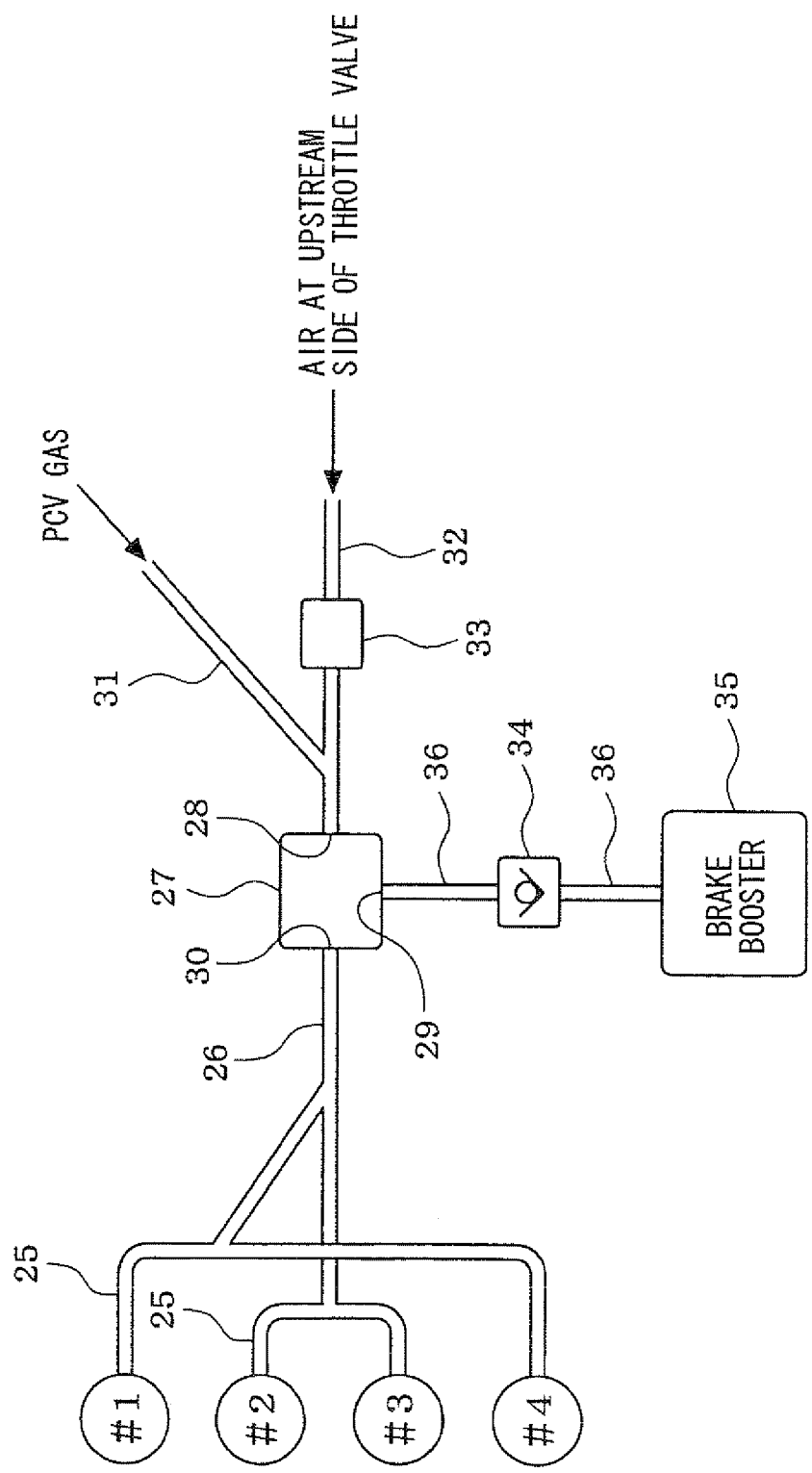
FIG. 3 is a schematic structure of a negative pressure control system for a braking operation according to the first embodiment.

As shown in FIG. 2, one end of a communication passage 25 is opened to the air passage 18 at the downstream side of the throttle valve 19, for applying the negative pressure in the intake manifold 14 to a braking system. As shown in FIG. 3, the communication passages 25 for the respective cylinders are converged at a negative pressure pipe 26, in which an air ejector 27 is provided. A pair of cylinders #1 and #4 and another pair of cylinders #2 and #3 are respectively connected to each other by the communication passages 25, and two pairs of the cylinders are connected to the single negative pressure pipe 26. In the above arrangement, an intake stroke (a time of generating the intake negative pressure) of one cylinder #1 or #2 in each pair is displaced from the other cylinder #4 or #3 by a crank angle of 360°, in order that amount of air or gas to be blown out into the respective air passages 18 at the downstream side of the throttle valve 19 through the communication passage 25 may be equally distributed for the respective cylinders and influence of intake negative pressure to the respective cylinders may be equalized.

Figure 4:
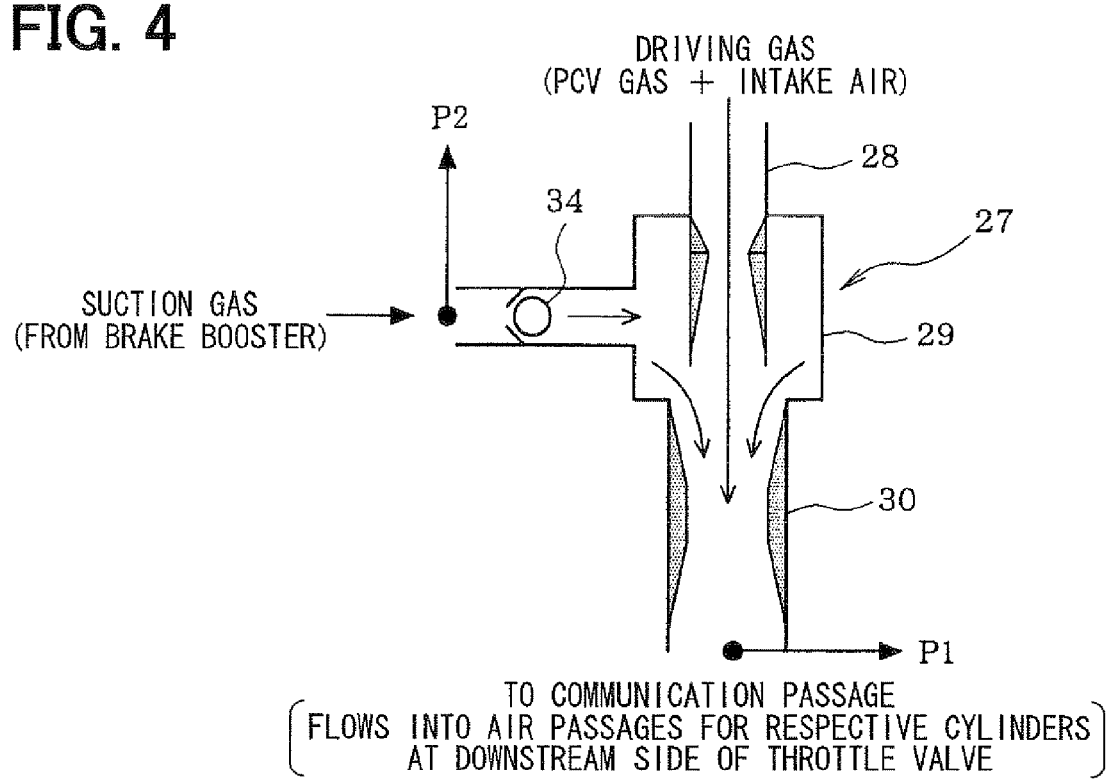
FIG. 4 is a schematic structure for explaining a structure of an air ejector.

As shown in FIG. 4, the air ejector 27 has a nozzle portion 28 for making driving gas to flow into a mixing chamber 29 at a high speed, the mixing chamber 29 for drawing suction gas around the nozzle portion 28 and mixing the driving gas with the suction gas, and a diffuser portion 30 for discharging the driving gas by mixing the suction gas to the driving gas. As shown in FIG. 3, the nozzle portion 28 (a side of the driving gas) of the air ejector 27 is connected to a passage 31 for a crankcase ventilating gas (also referred to as "PCV gas") and connected to an intake air branched passage 32, through which a part of the intake air (a branched intake air) in the surge tank 13 at an upstream side of the throttle valve 19 flows to the air ejector 27. A negative pressure control valve 33 is provided in the intake air branched passage 32. According to the above structure, the PCV gas as well as the branched intake air (of the atmospheric pressure) from the surge tank 13 flow into the nozzle portion 28 of the air ejector 27 as the driving gas, and the air amount of the branched intake air to the nozzle portion 28 is controlled by the negative pressure control valve 33.

Figure 6:
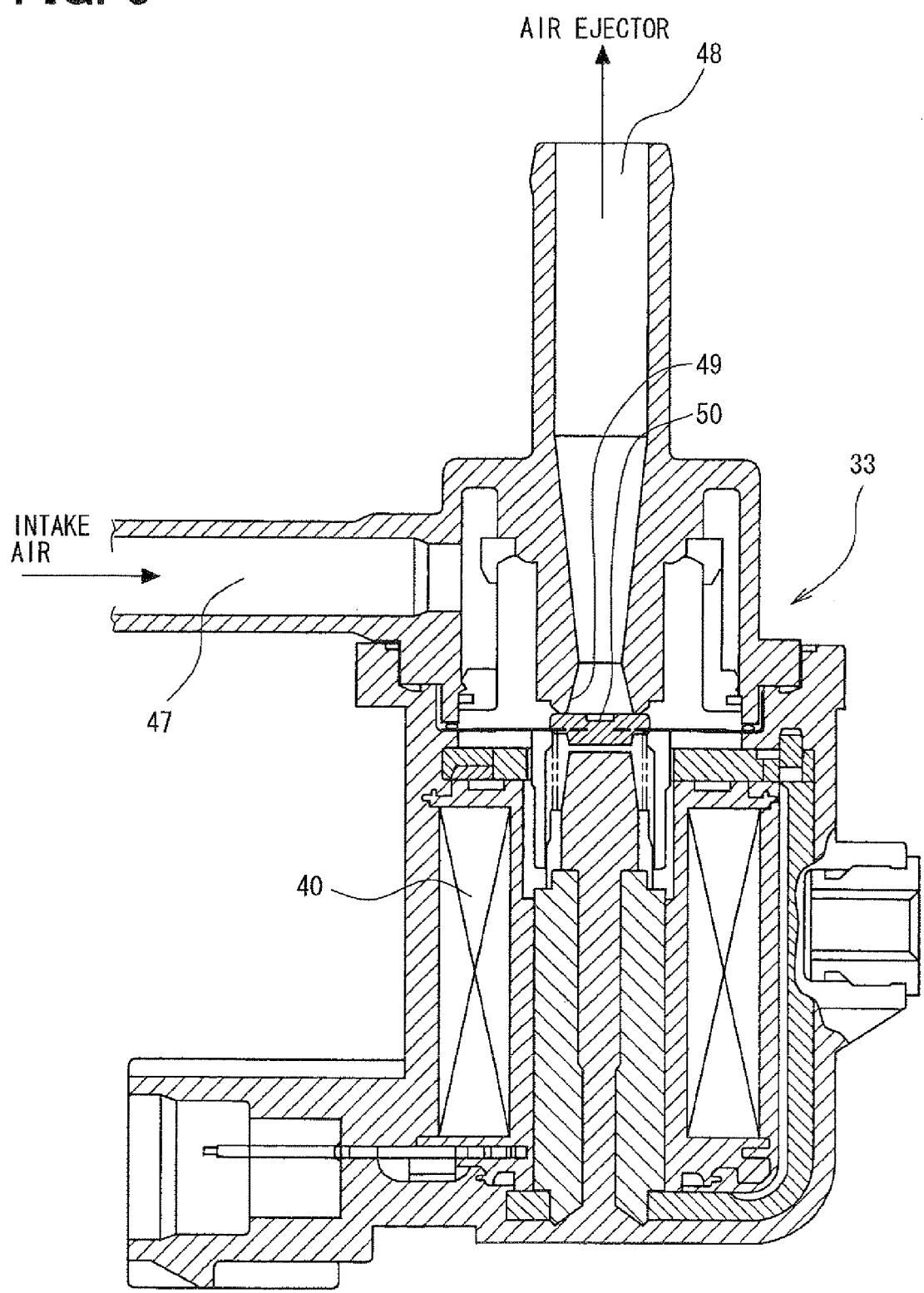
FIG. 6 is a sectional view showing a negative pressure control valve for explaining a structure of the negative pressure control valve according to the first embodiment.

The negative pressure control valve 33 is a flow control valve of a duty-ratio control type, as shown in FIG. 6. A cylindrical valve seat 49 and a valve body 50 are formed in a passage connecting a flow-in port 47 with a flow-out port 48. The cylindrical valve seat 49 is repeatedly opened and closed under a duty control at a predetermined frequency (for example, 15 to 30 Hz), and a ratio of the valve opening period in one cycle (current supply duty for an electromagnetic coil 40) is changed from 0 to 100%, so that the flow amount can be consecutively changed from 0 to a maximum flow amount.

A negative pressure passage 36 for a brake booster 35 is connected to the mixing chamber 29 (a side of the suction gas) of the air ejector 27 via a check valve 34. According to the structure shown in FIG. 4, negative pressure is generated around the nozzle portion 28 in the mixing chamber 29, when the driving gas (the PCV gas and the branched intake air of almost atmospheric pressure) flows into the mixing chamber 29 at the high speed from the nozzle portion 28 of the air ejector 27. Air is drawn from a negative pressure chamber of the brake booster 35 into the mixing chamber 29 by the above generated negative pressure through the negative pressure passage 36. As a result, a negative pressure for the brake booster 35 is generated.

As the check valve 34 is provided in the negative pressure passage 36 for the brake booster 35, a reverse flow of the air is automatically blocked by the check valve 34, when the negative pressure in the brake booster 35 (also referred to as braking negative pressure) is decreased to a target negative pressure and the flow-in of the driving gas from the nozzle portion 28 of the air ejector 27 is cut off. Accordingly, the braking negative pressure of the brake booster 35 is prevented from releasing to the air ejector 27, to maintain the braking negative pressure of the brake booster 35. A sensor 46 for the braking negative pressure (which is shown in FIG. 1) is provided in an inside of the brake booster 35.

An opening and closing pressure of the check valve 34 is set at, for example, "−295 mmHg" (opened when the braking negative pressure≧"−295 mmHg") and "−300 mmHg" (closed when the braking negative pressure≦"−300 mmHg"). The opening and closing pressure is referred to as a second predetermined negative pressure "PB2", as described below.

Figure 5:
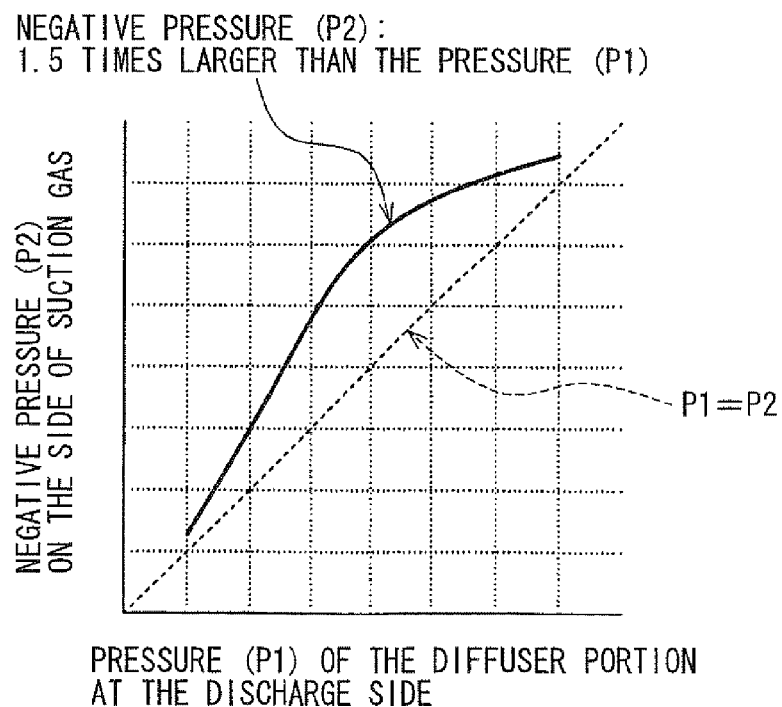
FIG. 5 is a graph showing a characteristic for explaining a negative pressure increasing effect of the air ejector.

The negative pressure pipe 26, to which the communication passages 25 for the respective cylinders are converged, is connected to the diffuser portion 30 (a gas discharge side) of the air ejector 27. As a result, the driving gas (the PCV gas and the branched intake air of almost atmospheric pressure) and the suction gas (the air in the brake booster 35) are blown out into the respective air passages 18 at the downstream side of the throttle valve 19 through the negative pressure pipe 26 and the communication passages 25. As shown in FIG. 5, a negative pressure "P2", which corresponds to 1.5 times of a negative pressure "P1" of the diffuser portion 30 of the air ejector 27 at the discharge side, can be generated at the suction side of the air ejector 27 (on a side of the brake booster 35).

Both of the PCV gas and the branched intake air are utilized as the driving gas for the air ejector 27. The amount of the branched intake air, which is supplied into the air ejector 27, is reduced by an amount corresponding to the PCV gas, and instead the amount of the intake air passing through the throttle valve 19 is increased by such amount, which is equal to the reduced amount of the branched intake air. As a result, control characteristic of the throttle valve 19 in a minute valve opening range is stabilized, such that an engine idling speed can be controlled at a lower speed.

In an engine operational condition under a low engine load, the throttle valve 19 is controlled in the minute valve opening range. According to the embodiment, when one side (the upper side) of the throttle valve 19 is minutely opened, the strong tumble air flow is generated at the downstream side of the throttle valve 19 by the air passing through the gap between the upper side of the throttle valve 19 and the inner surface of the housing 17. Fuel spray from the fuel injection valve is caught up by the tumble air flow. As a result, generation of air-fuel mixture in the intake manifold is improved.

According to the structure of the throttle valve 19, for example, as shown in FIG. 2, a part of the fuel spray from the fuel injection valve may be blown back to the throttle valve 19 by a backflow of the tumble air flow, and the fuel mist may be attached to a back side (a surface facing to an intake port 16) of the throttle valve 19. Then, the attached fuel is rapidly vaporized when the throttle valve 19 is largely opened to increase the amount of the intake air. In such a case, the air-fuel ratio may be changed to a rich side of the air-fuel ratio.

As shown in FIG. 2, the communication passage 25 is connected to the air passage 18 adjacent to the back surface of the throttle valve 19 on the side of the intake port 16, as one of countermeasures for the above mentioned problem. Namely the communication passage 25 is connected to the air passage 18 on a side (the lower side in the embodiment) in which air flow is not generated when the throttle valve 19 is slightly opened. More exactly, the open end of the communication passage 25 is directed to the throttle valve 19. According to such a structure, the gas and air can be sprayed from the open end of the communication passage 25 toward the back surface of the throttle valve 19. The fuel attached to the back surface of the throttle valve 19 is blown away by such sprayed gas and air. As a result, most of the fuel blown back to the throttle valve 19 by the backflow of the tumble air flow may not be attached to the back surface of the throttle valve 19.

The lower the ambient temperature becomes, the more the fuel may be attached to the back surface of the throttle valve 19. When the ambient temperature becomes lower than 5° C., a so-called "a valve icing" may occur, in which water vapor contained in the PCV gas or the air is condensed to be frozen. In addition, deposit (which is sticky mass made of carbons generated from combustion and engine oil) may increase sliding torque for the throttle valve.

According to the first embodiment, a PTC heater 38 which has a self temperature control function is provided at the back surface of each throttle valve 19, as a countermeasure for the above mentioned problem (the valve icing and the deposit of the sticky mass). Then, the back surface of the throttle valve 19, the inner surface of the air passage 18 of a side (that is a lower side) at which no air flow is generated when the throttle valve 19 is slightly opened, and the shaft 20 of the throttle valve 19 are heated by the PTC heater 38. According to such arrangement, the fuel attached to the back surface of the throttle valve 19 and the shaft 20 are vaporized by the heat of the PTC heater 38, in order that the fuel may not be attached to the back surface of the throttle valve 19, and the deposit may not become rigid to prevent the sliding torque of the throttle valve 19 from increasing. Furthermore, a portion in which the water vapor contained in the PCV gas and the air is condensed and such condensed water is pooled, that is the inner surface of the air passage is at which no air flow is generated when the throttle valve 19 is slightly opened, is heated by the PTC heater 38 so as to vaporize the condensed water. As a result, generation of the valve icing can be suppressed.

The PTC heater 38 having the self temperature control function is used in the first embodiment. It is, therefore, not necessary to control the current supply to the PTC heater 38 by ECU 41. A target temperature (for example, around 110° C.) can be automatically maintained. It is, however, possible to use an ordinary heater having no self temperature control function and to control the current supply to such heater under a duty-control or the like, so that the temperature of the heater may be controlled.

As shown in FIG. 1, a duty-control for the negative pressure control valve 33 as well as an ON-OFF control for the PTC heater 38 is carried out by the ECU 41 (an electronic control unit for the engine). The ECU 41 generally includes a microcomputer, to which signals from various kinds of sensors (such as, an ambient temperature sensor 42 for detecting the ambient temperature, an oil temperature sensor 43 for detecting temperature of engine lubricating oil, which represents temperature of the engine 11, a crank angle sensor 44 for detecting an engine rotational speed, an acceleration sensor 45 for detecting an operated stroke of an acceleration pedal, and a negative pressure sensor 46 for detecting the braking negative pressure of the brake booster 35) are inputted, so that the ECU 41 controls the fuel injection amount of the fuel injection valve and ignition timing for the spark plug, in accordance with the engine operational condition.

The ECU 41 further calculates a target opening degree of the throttle valve 19 depending on the operated stroke of the acceleration pedal, which is detected by the acceleration sensor 45. And the ECU 41 controls the electric motor 21, so that an actual opening position of the throttle valve 19 may coincide with the target opening degree.

The ECU 41 carries out programs shown in FIGS. 7 to 10 (described below) for controlling the braking negative pressure, so that the ECU 41 functions as a means for controlling the braking negative pressure for the brake booster 35. The ECU 41 further functions as a means for controlling intake air amount, wherein the amount of the intake air passing through the throttle valve 19 is reduced by such an amount corresponding to the intake air amount flowing through the negative pressure control valve 33. Furthermore, the ECU 41 functions as a means for controlling ON-OFF operation of the PTC heater 38.

The air amount to be charged into the respective cylinders (cylinder charging air amount) includes the PCV gas and the air flowing through the negative pressure control valve 33, in addition to the air passing through the throttle valve 19. The amount of the PCV gas is relatively small and has a little influence to the cylinder charging air amount. Accordingly, it is not necessary to take the amount of the PCV gas into consideration, when controlling the throttle valve 19. On the other hand, the amount of the intake air flowing through the negative pressure control valve 33 is larger compared with the amount of the PCV gas and therefore has a large influence to the cylinder charging air amount. Accordingly, it is preferable to consider the amount of the intake air flowing through the negative pressure control valve 33 when controlling the throttle valve 19. According to the first embodiment of the present invention, therefore, the amount of the intake air passing through the throttle valve 19 is reduced by such amount corresponding to the amount of the intake air flowing through the negative pressure control valve 33, so that a possible decrease of the controllability for the cylinder charging air amount to be caused by the amount of the intake air flowing through the negative pressure control valve 33 is prevented.

According to an operation for controlling the braking negative pressure, the amount of the intake air flowing through the negative pressure control valve 33 is increased to a first predetermined flow amount, when the braking negative pressure of the brake booster 35 is changed from a first predetermined negative pressure "PB1" (for example, −250 mmHg) to a side of the atmospheric pressure (C mmHg). The above first predetermined flow amount is set in accordance with the engine operational condition (such as, the engine rotational speed and the engine load ratio). When the braking negative pressure of the brake booster 35 comes back to a second predetermined negative pressure "PB2" (for example, −300 mmHg), which is lower than the first predetermined negative pressure "PB1", the air flow of the intake air flowing through the negative pressure control valve 33 is cut off.

As above, the necessary braking negative pressure is obtained by changing the air flow of the intake air flowing through the negative pressure control valve 33, with hysteresis, between the first predetermined flow amount and zero, so that the braking negative pressure of the brake booster 35 is controlled within a target range between the first and second predetermined negative pressures "PB1" and "PB2".

A process, which is carried out by the ECU 41 in accordance with the programs for the braking negative pressure shown in FIGS. 7 to 10, will be explained.

(Program for Braking Negative Pressure)

Figure 7:
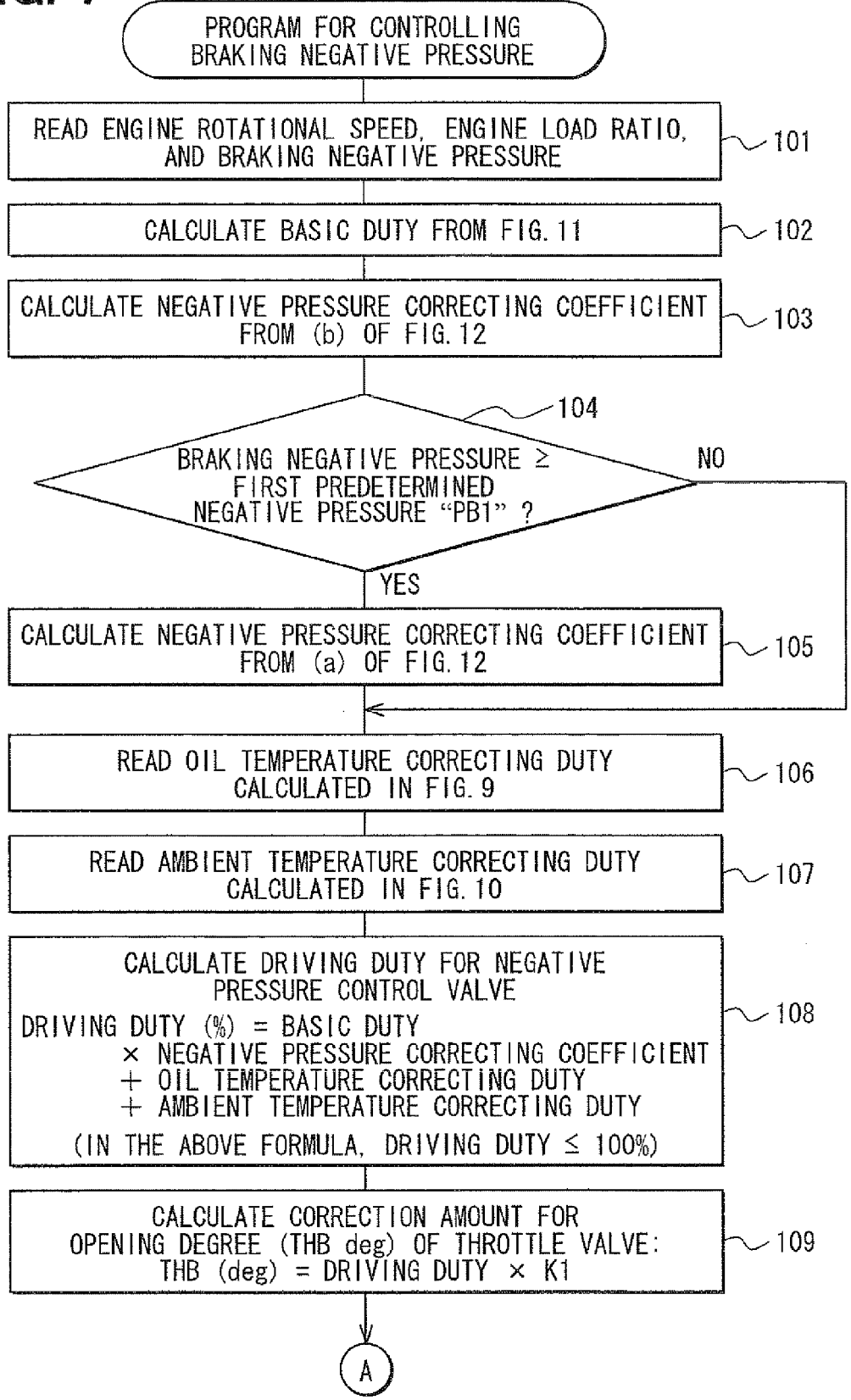
FIG. 7 is a first part of a flow chart for explaining a process of a program for negative pressure control for the braking operation according to the first embodiment.

The program for the braking negative pressure shown in FIG. 7 is repeatedly carried out at a predetermined cycle (e.g. at a frequency of 128 ms) during an engine operation. When an operation of the program starts, the current engine rotational speed, the engine load ratio, and the braking negative pressure, which are respectively detected by the sensors, are read at a step 101. At a step 102, the ECU 41 calculates a basic duty in accordance with the current engine rotational speed and engine load ratio, based on a map shown in FIG. 11 for the basic duty for the negative pressure control valve 33. The basic duty corresponds to a driving duty for the negative pressure control valve 33 under a standard condition, in which an influence of the intake air flowing through the negative pressure control valve 33 as well as an influence of the temperature of the engine oil and the ambient temperature is not taken into consideration. In the map shown in FIG. 11 for the basic duty for the negative pressure control valve 33, the basic duty is decreased as the engine rotational speed becomes lower and/or the engine load ratio becomes smaller, so that the amount of the intake air (the first predetermined flow amount) flowing through the negative pressure control valve 33 is decreased. As a result, the amount of the intake air (the first predetermined flow amount) flowing through the negative pressure control valve 33 can be set at such a value, which makes it possible to achieve a controllability by the throttle valve 19 for an idling rotational speed (ISC controllability) and to achieve the braking negative pressure in a range out of an ISC control range.

Then, the process goes to a step 103, at which the ECU 41 calculates a negative pressure correcting coefficient in accordance with the current braking negative pressure, based on a map for a negative pressure correcting coefficient shown in (b) of FIG. 12. The negative pressure correcting coefficient is a coefficient for correcting the amount of the intake air (the driving duty) flowing through the negative pressure control valve 33 depending on the current braking negative pressure.

At a next step 104, the ECU 41 determines whether the current braking negative pressure is changed from the first predetermined negative pressure "PB1" (e.g. −250 mmHg) to the side of the atmospheric pressure (0 mmHg). When it is the case, the process goes to a step 105, at which the ECU 41 calculates again the negative pressure correcting coefficient in accordance with the current braking negative pressure, which has been changed from the first predetermined negative pressure "PB1" to the side of the atmospheric pressure, based on the map for the negative pressure correcting coefficient shown in (a) of FIG. 12. When the ECU 41 determines at the step 104 that the current braking negative pressure is not changed from the first predetermined negative pressure "PB1" to the side of the atmospheric pressure, the negative pressure correcting coefficient calculated at the step 103 is used.

The process further goes to a step 106, at which the ECU 41 reads an oil temperature correcting duty, which is calculated by a program shown in FIG. 9 (described below) for calculating the oil temperature correcting duty. The oil temperature correcting duty is a correcting duty for correcting the amount of the intake air (the driving duty) flowing through the negative pressure control valve 33 depending on the current temperature of the engine lubricating oil. At a next step 107, the ECU 41 reads an ambient temperature correcting duty, which is calculated by a program shown in FIG. 10 (described below) for calculating the ambient temperature correcting duty. The ambient temperature correcting duty is a correcting duty for correcting the amount of the intake air (the driving duty) flowing through the negative pressure control valve 33 depending on the ambient temperature.

Then, the process goes to a step 108, at which the ECU 41 calculates the driving duty for the negative pressure control valve 33, in accordance with the following formula:

"the driving duty for the negative pressure control valve 33=the basic duty X negative pressure correcting coefficient+the oil temperature correcting duty+the ambient temperature correcting duty"

In the above formula, the driving duty is guarded such that the driving duty does not go beyond 100%.

The amount of the intake air flowing through the negative pressure control valve 33 is controlled by the above driving duty for the negative pressure control valve 33.

At a next step 109, the ECU 41 calculates a correction amount for an opening degree (THB deg) of the throttle valve 19 in accordance with the following formula:

"*THB*=the driving duty for the negative pressure control valve 33×*K*1"

In the above formula, K1 is a conversion factor for converting the driving duty for the negative pressure control valve 33 (the amount of the intake air flowing through the negative pressure control valve 33) into the correction amount for the opening degree of the throttle valve 19.

Figure 8:
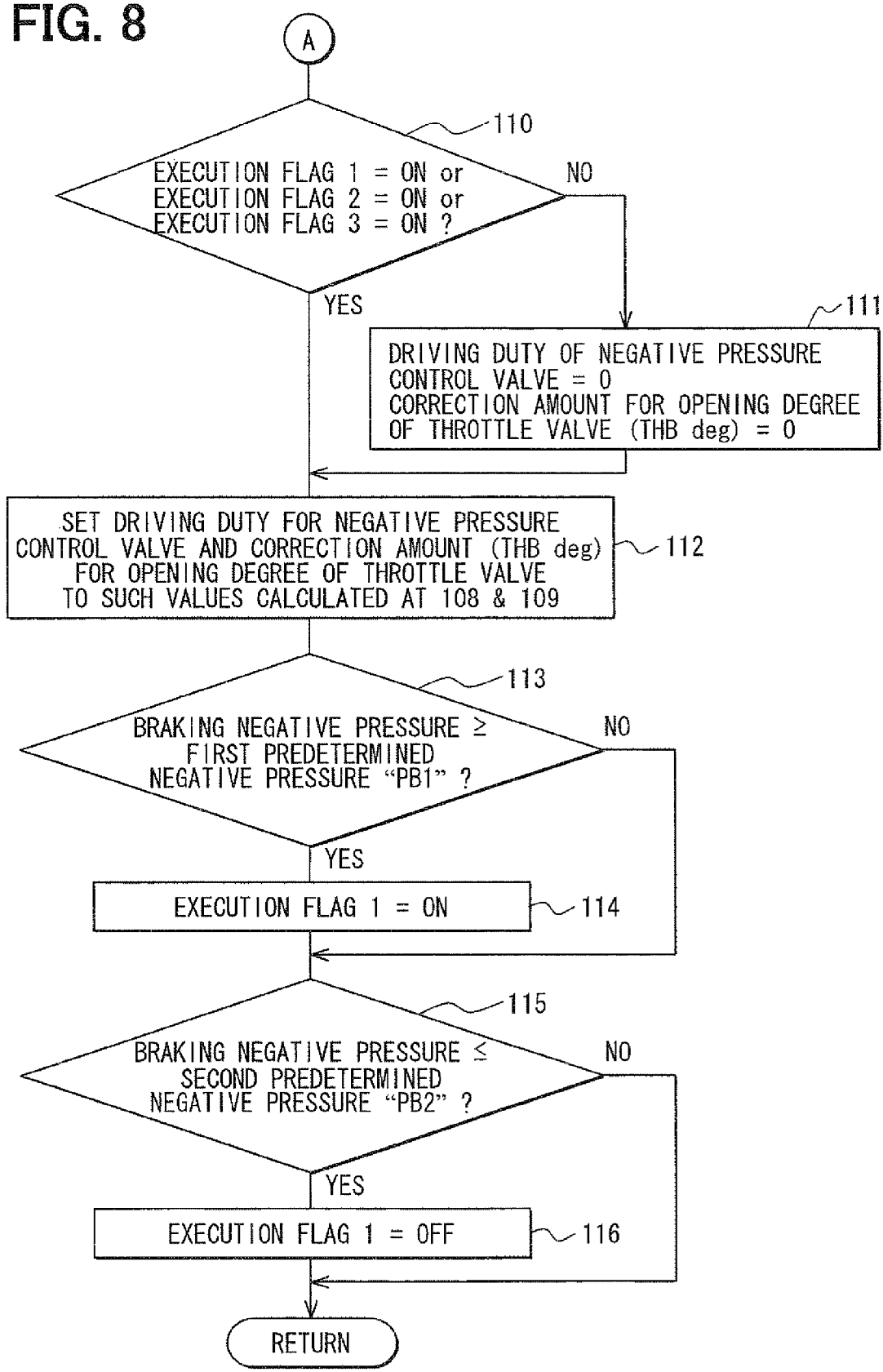
FIG. 8 is a second part of the flow chart for explaining the process of the program for the negative pressure control for the braking operation according to the first embodiment.

Then, the process goes to a step 110 shown in FIG. 8, at which the ECU 41 determines whether any one of an execution flag 1 to an execution flag 3 is turned on. The execution flags 1 to 3 are turned on or off according to the process carried out by the programs shown in FIGS. 9 and 10. Each of the execution flags 1 to 3 is a flag showing a control range for controlling the braking negative pressure (a duty control for the negative pressure control valve 33).

When all of the execution flags 1 to 3 are turned off, at the step 110, the ECU 41 determines that the necessary braking negative pressure is achieved and that there is little fuel attached to the back surface of the throttle valve 19 and little condensed water. As a result, the ECU 41 determines that it is not necessary to carry out the control for the braking negative pressure (the duty control for the negative pressure control valve 33). The process goes to a step 111, at which the ECU 41 sets the driving duty for the negative pressure control valve 33 at "zero" to move (or hold) the negative pressure control valve 33 to its closed position, so that the amount of the intake air flowing through the negative pressure control valve 33 becomes zero. In addition, the ECU 41 sets the correction amount for the opening degree (THB deg) of the throttle valve 19 to "zero". Then, the process goes to a step 112.

When one of the execution flags 1 to 3 is turned on, the ECU 41 determines at the step 110 that it is necessary to carry out the control for the braking negative pressure (the duty control for the negative pressure control valve 33). Then, the process goes to the step 112, at which the ECU 41 sets the driving duty for the braking negative pressure and the correction amount for the opening degree (THB deg) of the throttle valve 19 to such values, which are respectively calculated at the steps 108 and 109.

In the case that all of the execution flags 1 to 3 are turned off, the ECU 41 sets (maintains), at the step 112, the driving duty for the braking negative pressure and the correction amount for the opening degree (THB deg) of the throttle valve 19 at "zero".

Then, the process goes to a step 113, at which the ECU 41 determines whether the current braking negative pressure is changed from the first predetermined negative pressure "PB1" (e.g. −250 mmHg) to the side of the atmospheric pressure (0 mmHg). When it is the case, the ECU 41 determines that the braking negative pressure is coming short, and the process goes to a step 114 at which the execution flag 1 is turned on. The execution flag 1 is the flag for carrying out the duty control for the negative pressure control valve 33 in the case of shortage of the braking negative pressure. Then, the process goes to a step 115. When the ECU 41 determines that the current braking negative pressure is not changed from the first predetermined negative pressure "PB1" to the side of the atmospheric pressure, at the above step 113, the process goes from the step 113 to the step 115.

At the step 115, the ECU 41 determines whether the braking negative pressure has recovered to the second predetermined negative pressure "PB2" (e.g. −300 mmHg), which is lower than the first predetermined negative pressure "PB3". If it is not the case, the process of the program is terminated. Then, when the braking negative pressure has recovered to become lower than the second predetermined negative pressure "PB2" (the determination of the step 115 is YES), the ECU 41 determines that the braking negative pressure is sufficiently obtained. The process goes to a step 116, at which the ECU 41 sets the execution flag 1 (for carrying out the duty control for the negative pressure control valve 33 in the case of shortage of the braking negative pressure) to an OFF state. And the process for the program is terminated.

(Program for Oil Temperature Correcting Duty)

Figure 9:
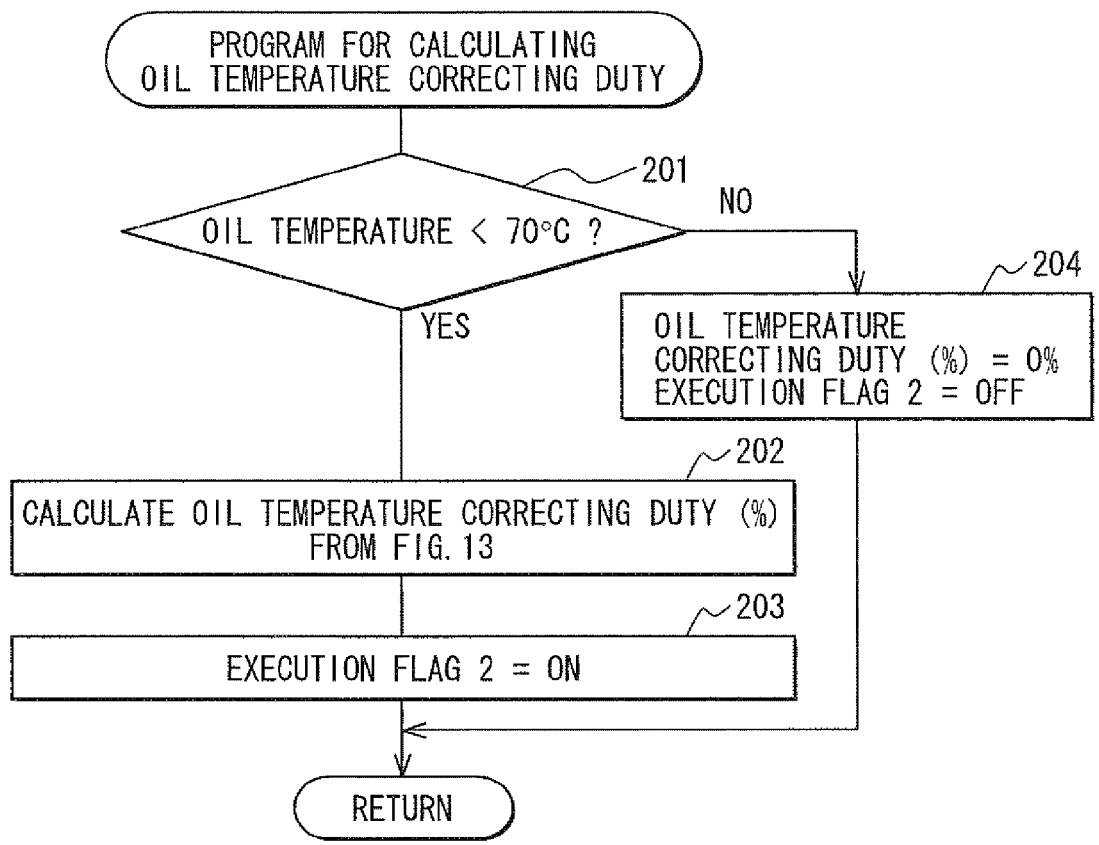
FIG. 9 is a flow chart for explaining a process of a program for calculating oil temperature correcting duty according to the first embodiment.

The program shown in FIG. 9 for calculating the oil temperature correcting duty is repeatedly carried out at a predetermined cycle (for example, at a frequency of 1024 ms). When an operation of the program starts, the ECU 41 determines at a step 201 whether the oil temperature detected by the oil temperature sensor 43 is lower than a predetermined temperature, for example 70° C., which is a temperature for determining whether the engine is completely warmed up. When the oil temperature is lower than 70° C., the ECU 41 determines that the engine 11 is not yet completely warmed up, and the process goes to a step 202, at which the ECU 41 calculates oil temperature correcting duty in accordance with the current oil temperature, based on a map shown in FIG. 13 for the oil temperature correcting duty. In the map shown in FIG. 13 for the oil temperature correcting duty, the oil temperature correcting duty becomes larger as the oil temperature becomes lower. Accordingly, the amount of the intake air flowing through the negative pressure control valve 33 becomes larger, as the oil temperature (that is the temperature of the engine 11) becomes lower.

Generally, the lower the temperature of the engine 11 becomes, the more the fuel injection amount becomes. As a result, the amount of the fuel, which is attached to the back surface of the throttle valve 19 due to the back flow of the tumble air flow, is increased. According to the first embodiment, therefore, the ECU 41 determines that the amount of the fuel attached to the back surface of the throttle valve 19 becomes larger, when the engine 11 is not completely warmed up, even in the condition (the execution flag 1=OFF) that the braking negative pressure is sufficiently obtained as a result that the braking negative pressure becomes lower than the second negative pressure "PB2" (e.g. −300 mmHg) Namely, the ECU 41 does set the driving duty for the negative pressure control valve 33 not to "zero" but to the value for the oil temperature correcting duty, which is defined by the oil temperature. Accordingly, the amount of the intake air (the second predetermined flow amount) flowing through the negative pressure control valve 33 is increased, when the engine temperature is low even in the condition (the execution flag 1=OFF) that the braking negative pressure is sufficiently obtained. And the fuel attached to the throttle valve 19 is blown away due to such increased amount of the intake air. As a result, the deviation of the air-fuel ratio, which is otherwise caused by the fuel attached to the throttle valve 19 when the engine is not completely warmed up, can be suppressed to a smaller amount.

A temperature of engine cooling water may be used as a temperature information for the engine 11, instead of the oil temperature, so that the correcting duty is set depending on the temperature of the engine cooling water.

The process goes from the step 202 to a step 203, at which the ECU 41 sets the execution flag 2 to an ON state, which corresponds to a condition in which the duty control is carried out for the negative pressure control valve 33 before the engine 11 is not completely warmed up. The process is then terminated.

When the oil temperature detected by the oil temperature sensor 43 is higher than 70° C., the ECU 41 determines at the step 201 that the engine 11 is completely warmed up. Then, the process goes to a step 204, at which the ECU 41 sets the oil temperature correcting duty to "zero", and turns the execution flag 2 to an OFF state. The process is then terminated.

(Program for Ambient Temperature Correcting Duty)

Figure 10:
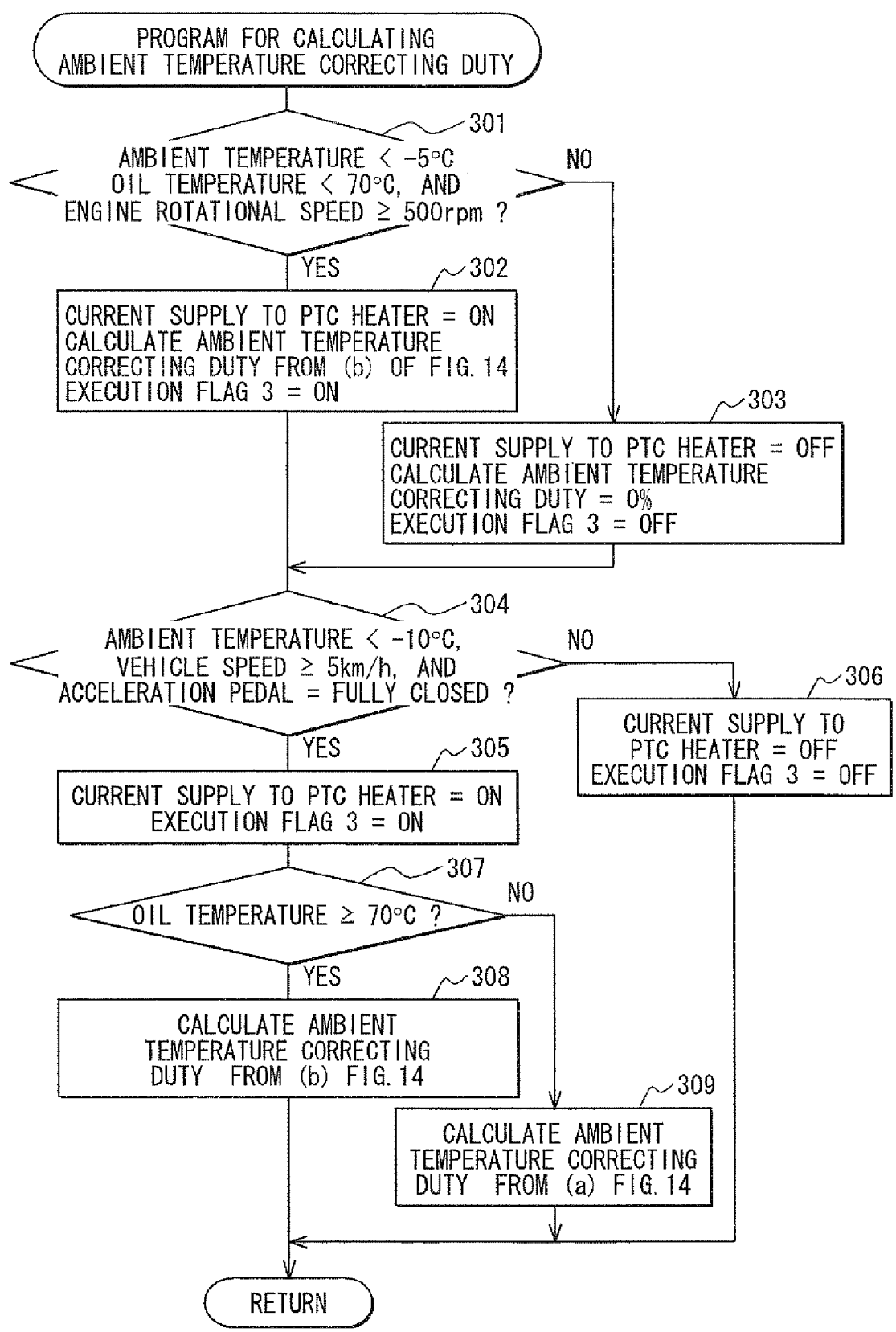
FIG. 10 is a flowchart for explaining a process of a program for calculating ambient temperature correcting duty according to the first embodiment.

The program shown in FIG. 10 for calculating the ambient temperature correcting duty is repeatedly carried out at a predetermined cycle (for example, at a frequency of 256 ms). When an operation of the program starts, the ECU 41 determines at a step 301 whether a condition for current supply to the PTC heater 38 is satisfied or not, namely whether all of the following three conditions (a1) to (a3) are satisfied.

(a1) the ambient temperature detected by the ambient temperature sensor 42 is lower than a predetermined temperature, for example, −5° C., (a2) the oil temperature detected by the oil temperature sensor 43 is lower than the predetermined temperature for determining that the engine is completely warmed up, for example, 70° C., and (a3) the engine rotational speed is higher than a predetermined speed, for example, 500 rpm.

In the above conditions (a1) to (a3), the threshold values for the ambient temperature, the oil temperature, and the engine rotational speed may be changed.

When all of the above three conditions (a1) to (a3) are satisfied, it is the case for the engine operation, in which the fuel is likely to be attached to the back surface of the throttle valve 19, and the water vapor contained in the PCV gas or the air is likely to be condensed and frozen. Accordingly, the ECU 41 determines at the step 301 that the condition for current supply to the PTC heater 38 is satisfied, and the process goes to a step 302 at which the current is supplied to the PTC heater 38. The fuel attached to the back surface of the throttle valve 19 or the shaft 20 is vaporized by the heat of the PTC heater 38, in order to prevent that a large amount of fuel may be attached to the back surface of the throttle valve 19, and that the deposit may become rigid and the sliding torque for the throttle valve 19 is thereby increased. Furthermore, the portion in which the water vapor contained in the PCV gas and the air is condensed and such condensed water is pooled, that is the inner surface of the air passage 18 at which no air flow is generated when the throttle valve 19 is slightly opened, is heated by the PTC heater 38 so as to vaporize the condensed water. As a result, the generation of the valve icing can be suppressed.

At the step 302, the ECU 41 calculates the ambient temperature correcting duty in accordance with the current engine rotational speed, based on a map shown in (b) of FIG. 14 for the ambient temperature correcting duty after the engine is completely warmed up.

Furthermore, the ECU 41 sets the execution flag 3 to an ON state, which corresponds to a condition in which the duty control is carried out for the negative pressure control valve 33 when the current is supplied to the PTC heater.

When any one of the above three conditions (a1) to (a3) is not satisfied, the condition for current supply to the PTC heater 38 is not satisfied. Therefore, the process goes from the step 301 to a step 303, at which the ECU 41 cuts off the current supply to the PTC heater 38, sets the ambient temperature correcting duty to "zero", and turns off the execution flag 3 for the duty control.

After the current supply to the PTC heater 38 is turned on or off at the step 302 or 303, the process goes to a step 304, at which the ECU 41 determines whether a condition for current supply execution to the PTC heater 38 is satisfied or not, namely whether all of the following conditions (b1) to (b3) are satisfied or not.

(b1) the ambient temperature detected by the ambient temperature sensor 42 is lower than a predetermined temperature, for example, −10° C., (b2) a vehicle speed detected by a vehicle speed sensor (not shown) is larger than a predetermined speed, for example, 5 km/h, and (b3) an opening degree of the acceleration pedal detected by the acceleration sensor 45 is zero (i.e. fully closed).

In the above conditions (b1) to (b3), the threshold values may be also changed.

When all of the above three conditions (b1) to (b3) are satisfied, the condition for the current supply execution to the PTC heater 38 is satisfied, and the process goes to a step 305. Then, at the step 305, the current is supplied to the PTC heater 38, and the ECU 41 turns on the execution flag 3 for the duty control to the negative pressure control valve 33 during a vehicle deceleration or the current supply to the heater 38.

When the ambient temperature is lower than the predetermined temperature (e.g. −10° C.), the condensation of the water or freezing of the water may be generated. Therefore, the current is supplied to the PTC heater 38 during a period from an operation of the vehicle deceleration (which corresponds to a light load to the engine) to an idling operation, even in the case that the engine 11 is completely warmed up, in order to prevent the generation of the condensation of the water or freezing of the water. In an operation range of the vehicle deceleration, an amount of electric power generation at an electric power generator can be increased by use of excessive torque for the engine 11. Accordingly, even when the current is supplied to the PTC heater 38, a fuel consumption ratio may not be deteriorated.

Then, the process goes to a step 307, at which the ECU 41 determines whether the oil temperature detected by the oil temperature sensor 43 is higher than the predetermined temperature, for example 70° C., which is the temperature for determining that the engine is completely warmed up. When it is the case, the process goes to a step 308, at which the ECU 41 calculates the ambient temperature correcting duty in accordance with the current engine rotational speed, based on the map shown in (b) of FIG. 14 for the ambient temperature correcting duty after the engine is completely warmed up. In the map shown in (b) of FIG. 14 for the ambient temperature correcting duty, the ambient temperature correcting duty becomes larger as the engine rotational speed is increased. However, the values shown in (b) of FIG. 14 for the ambient temperature correcting duty after the complete warmed-up condition of the engine are made smaller than those corresponding values shown in (a) of FIG. 14 for the ambient temperature correcting duty prior to the complete warmed-up condition of the engine.

When the oil temperature is lower than 70° C., the process goes from the step 307 to a step 309, at which the ECU 41 calculates the ambient temperature correcting duty in accordance with the current engine rotational speed, based on the map shown in (a) of FIG. 14 for the ambient temperature correcting duty prior to the complete warmed-up condition of the engine. In the map shown in (a) of FIG. 14 for the ambient temperature correcting duty, the ambient temperature correcting duty likewise becomes larger as the engine rotational speed is increased (a third predetermined flow amount).

According to the above process, the amount of the intake air flowing through the negative pressure control valve 33 is controlled in accordance with the engine operational condition (the engine rotational speed and the oil temperature), during a period in which the current is supplied to the PTC heater 38.

The condensed water pooled in the air ejector 27 can be discharged to bring back the negative pressure increasing performance of the air ejector 27, when the amount of the intake air flowing through the negative pressure control valve 33 is controlled in accordance with the engine operational condition in conjunction with the current supply to the PTC heater 38. Furthermore, a neighboring portion to the PTC heater 38 can be heated by spraying the air to the PTC heater 38, so that the fuel and/or condensed water attached to such neighboring portion can be also effectively vaporized.

When any one of the above three conditions (b1) to (b3) is not satisfied at the step 304, the condition for current supply execution to the PTC heater 38 is not satisfied. Then, the process goes to a step 306, at which the ECU 41 turns off the current supply to the PTC heater 38, and the ECU 41 turns off the execution flag 3 for the duty control to the negative pressure control valve 33 during the vehicle deceleration and the current supply to the heater 38. The operation for the program is then terminated.

According to the above first embodiment, the air ejector 27 is provided in the negative pressure pipe 26, to which the communication passages 25 for the respective cylinders are converged. The negative pressure passage 36 of the brake booster 35 is connected to the suction gas side of the air ejector 27 via the check valve 34, whereas the passage 31 for the PCV gas and the intake air branched passage 32 for bifurcating the part of the intake air from the surge tank 13 at the upstream side of the throttle valve 19 are connected to the driving gas side of the air ejector 27, wherein the negative pressure control valve 33 is provided in the intake air branched passage 32. The PCV gas and the part of the intake air are forced to flow into the driving gas side of the air ejector 27, so that the air ejector 27 functions as a vacuum pump. As a result, the braking negative pressure for the brake booster 35 can be surely reduced to the target negative pressure, even when the intake air pressure at the downstream side of the throttle valve 19 is higher than the target negative pressure.

Furthermore, since the check valve 34 is provided in the negative pressure passage 36 of the brake booster 35, which is connected to the suction gas side of the air ejector 27, the check valve 34 is automatically closed to prevent the reverse flow of the air when the flow-in of the air to the driving gas side of the air ejector 27 is cut off. Namely, even when the braking negative pressure of the brake booster 35 is decreased to the target negative pressure and the flow-in of the air to the driving gas side of the air ejector 27 is cut off, the check valve 34 prevents the braking negative pressure of the brake booster 35 from releasing to the side of the air ejector 27, so that the braking negative pressure of the brake booster 35 can be maintained.

Furthermore, since the PCV gas is used together with the branched intake air as the driving gas for the air ejector 27, the amount of the intake air flowing into the air ejector 27 can be reduced by such amount corresponding to that of the PCV gas. And instead the amount of the intake air passing through the throttle valve 19 is increased by such amount, which is equal to the reduced amount of the branched intake air. As a result, the control characteristic of the throttle valve 19 in a minute valve opening range is stabilized, and the engine idling speed can be thereby controlled at the lower speed.

In addition, the communication passage 2S5 for the respective cylinders is connected to the air passage 18 adjacent to the back surface of the throttle valve 19 on the side of the intake port 16. Namely the communication passage 25 is connected to the air passage 18 on the side (the lower side in the first embodiment) in which air flow is not generated when the throttle valve 19 is slightly opened. More exactly, the open end of the communication passage 25 is directed to the throttle valve 19. According to such a structure, the gas and air can be sprayed from the open end of the communication passage 25 toward the back surface of the throttle valve 19. The fuel attached to the back surface of the throttle valve 19 is blown away by such sprayed gas and air. As a result, most of the fuel blown back to the throttle valve 19 by the backflow of the tumble air flow may not be attached to the back surface of the throttle valve 19.

Second Embodiment

The above first embodiment shows an example, in which the air ejector 27 is used. It is not necessary to positively use the PCV gas as the driving gas for the air ejector 27, in such an engine in which the amount of the PCV gas is small, or in such an arrangement in which the PCV gas is discharged into the intake pipe at the upstream side of the throttle valve 19 (adjacent to a fully closed position of the throttle valve 19).

According to such an arrangement, the air ejector 27 may be eliminated, but a structure according to a second embodiment shown in FIGS. 15 to 20 may be used. The second embodiment will be explained below.

Figure 15:
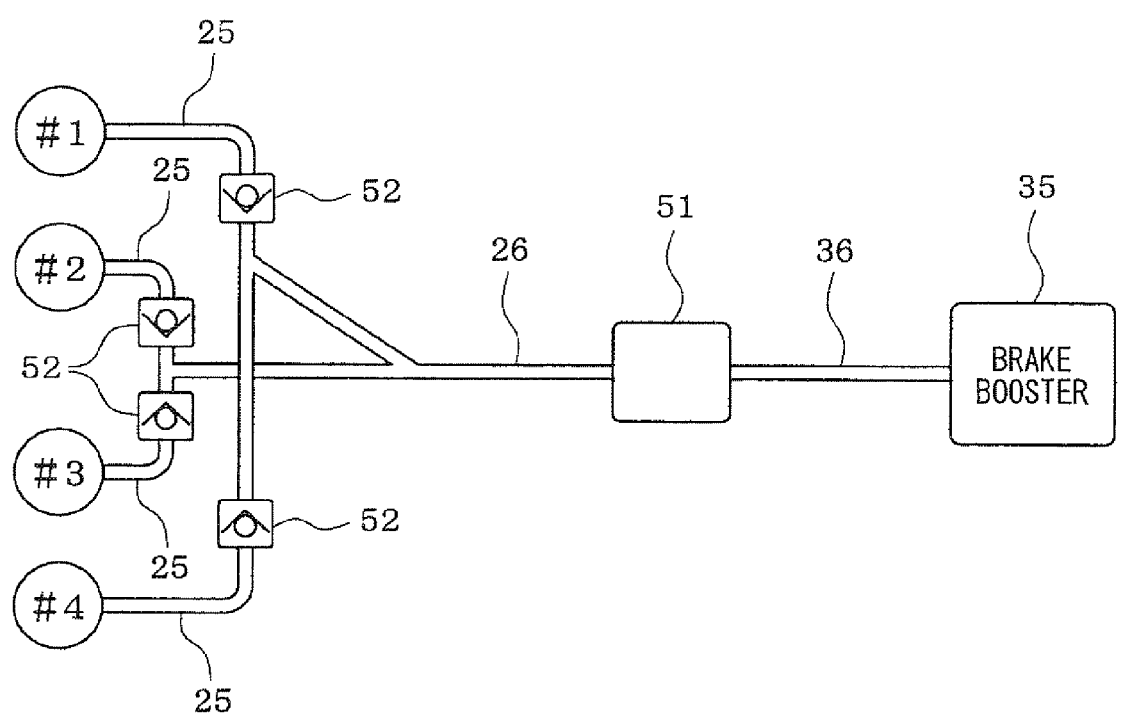
FIG. 15 is a schematic structure of a negative pressure control system for a braking operation according to a second embodiment.

According to the second embodiment, as shown in FIG. 15, is the negative pressure passage 36 of the brake booster 35 is connected to the negative pressure pipe 26, to which the communication passages 25 for the respective cylinders are converged, via a negative pressure control valve 51. A check valve 52 is provided in each of the communication passages 25 for the respective cylinders. Each of the check valves 52 for the respective cylinders prevents the negative pressure of the brake booster 35 from escaping to the side of the engine 11 (namely, the air flows back from the engine side to the brake booster 35). An opening and closing pressure of the check valve 52 is set at, for example, "−295 mmHg" (opened when the braking negative pressure≧"−295 mmHg") and "−300 mmHg" (closed when the braking negative pressure≧"−300 mmHg") The opening and closing pressure is referred to as the second predetermined negative pressure "PB2".

One check valve may be provided in the negative pressure passage 36 of the brake booster 35, as in the same manner to the first embodiment. In such a case, the check valves 52 for the respective cylinders are no longer necessary.

Figure 16:
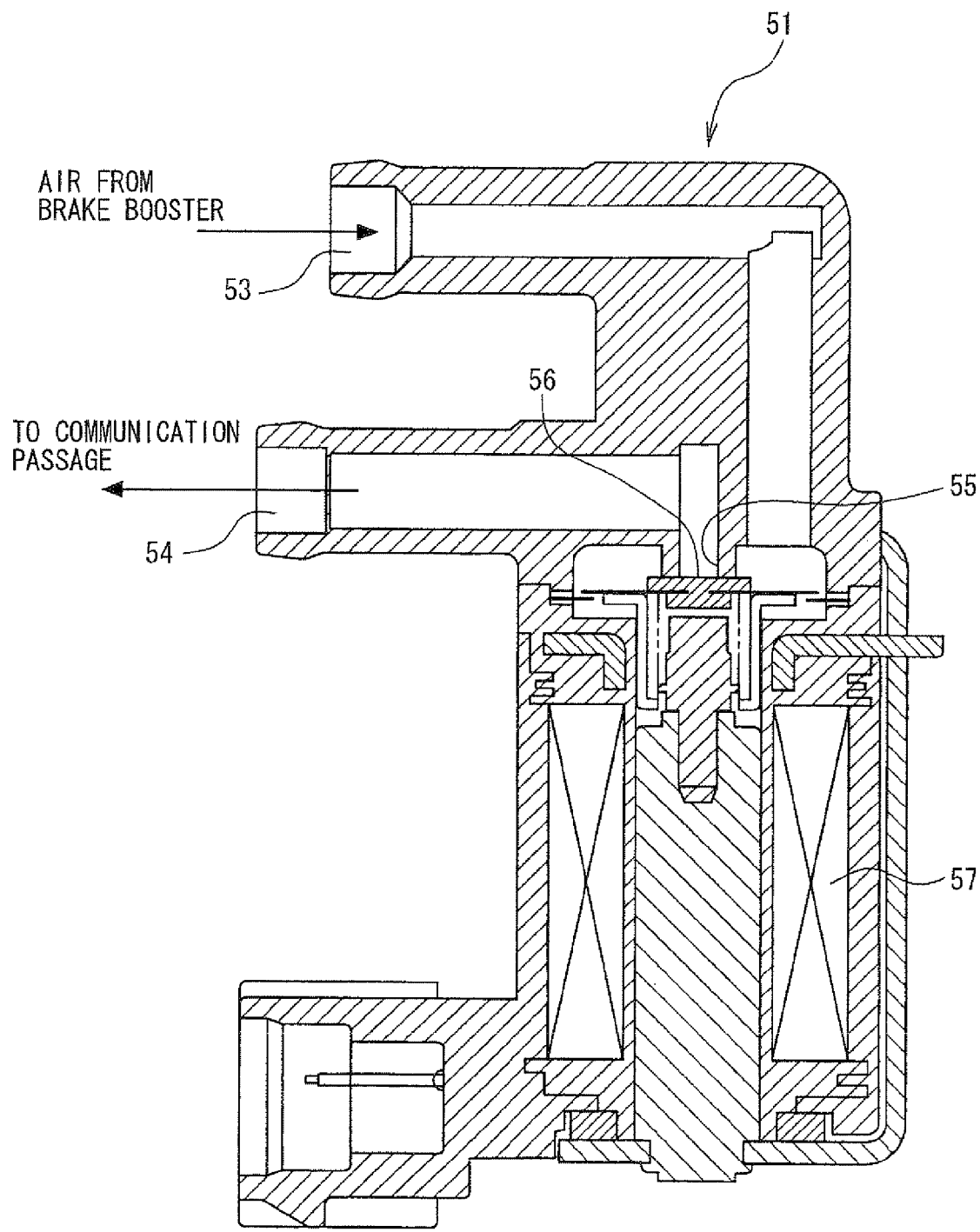
FIG. 16 is a sectional view showing a negative pressure control valve for explaining a structure of the negative pressure control valve according to the second embodiment.

The negative pressure control valve 51 is a flow control valve of a duty-ratio control type, as shown in FIG. 16. A cylindrical valve seat 55 and a valve body 56 are formed in a passage connecting a flow-in port 53 with a flow-out port 54. The cylindrical valve seat 55 is repeatedly opened and closed under a duty control at a predetermined frequency, and a ratio of the valve opening period in one cycle (current supply duty for an electromagnetic coil 57) is changed from 0 to 100%, so that the flow amount can be consecutively changed from 0 to a maximum flow amount.

According to the negative pressure control valve 51 of the second embodiment, the intake air does not flow through the valve 51. Accordingly, the valve having the maximum flow amount, which is smaller than that of the negative pressure control valve 33 for the first embodiment, can be used.

According to the structure of the valve 51, the negative pressure control valve 51 is opened when the braking negative pressure is necessary, so that the negative pressure of the intake air is applied to the brake booster 35 to achieve the braking negative pressure. A sensor (not shown) for the braking negative pressure is provided in the inside of the brake booster 35. As above, the braking negative pressure is controlled by a simple structure.

According to the second embodiment, as in the same manner to the first embodiment, the communication passage 25 for the respective cylinders is connected to the air passage 18 adjacent to the back surface of the throttle valve 19 on the side of the intake port 16. Namely the communication passage 25 is connected to the air passage 18 on the side in which air flow is not generated when the throttle valve 19 is slightly opened. More exactly, the open end of the communication passage 25 is directed to the throttle valve 19. The other structure is the same to the first embodiment.

Figure 17:
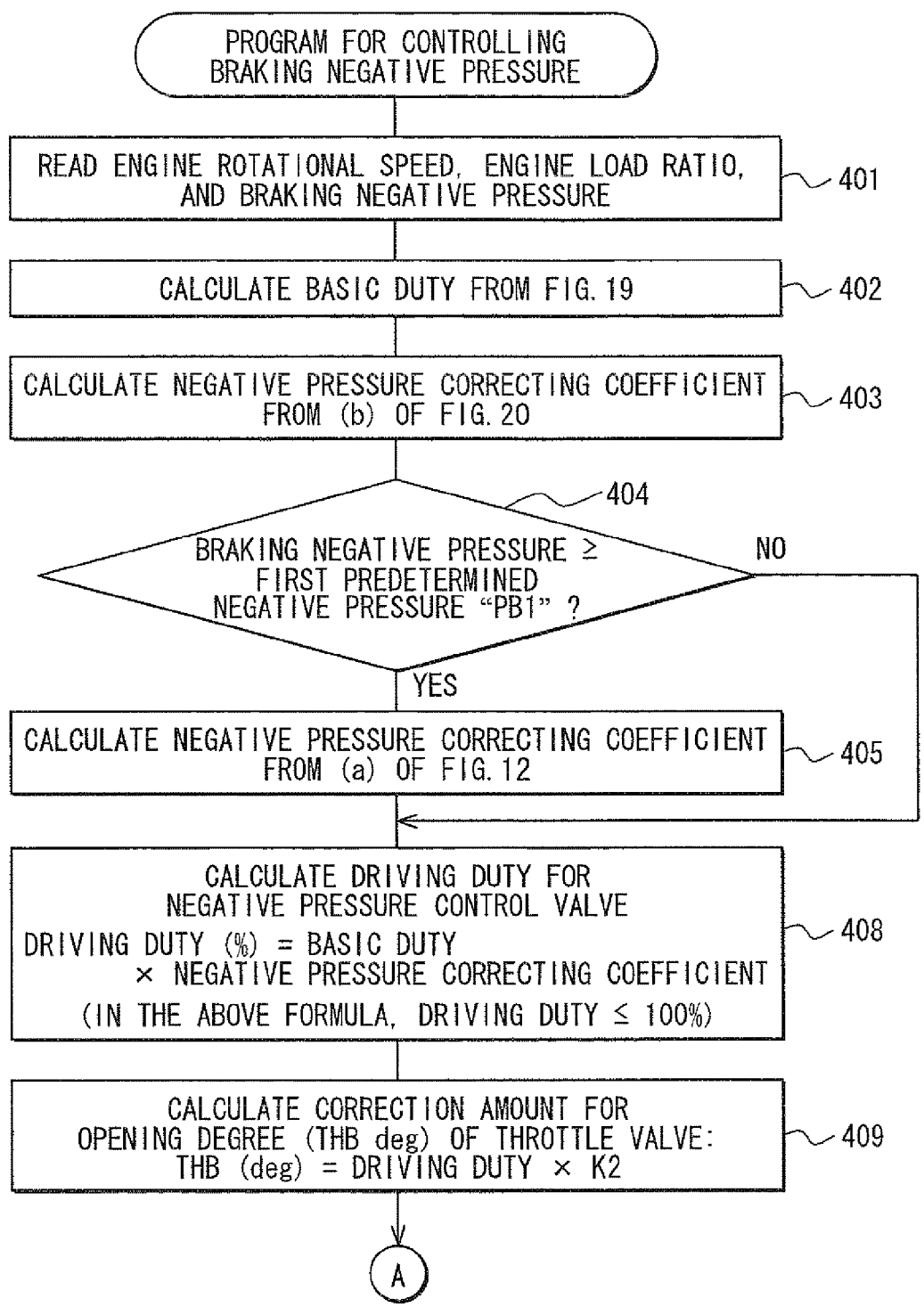
FIG. 17 is a first part of a flow chart for explaining a process of a program for negative pressure control for the braking operation according to the second embodiment.
Figure 18:
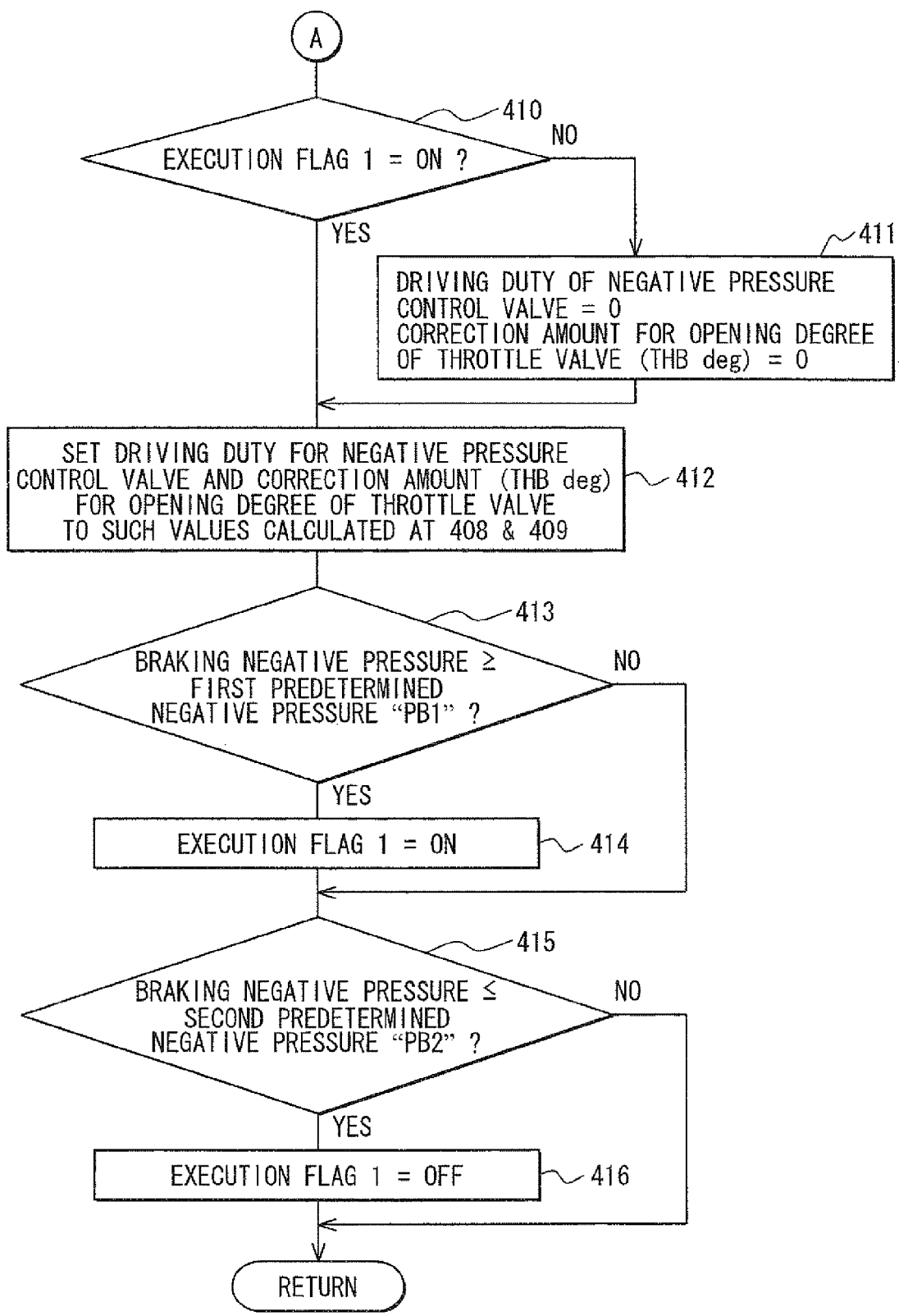
FIG. 18 is a second part of the flow chart for explaining the process of the program for negative pressure control for the braking operation according to the second embodiment.

The ECU 41 carries out programs shown in FIGS. 17 and 18 (described below) for controlling the braking negative pressure of the brake booster 35, so that the ECU 41 functions as a means for controlling the braking negative pressure for the brake booster 35. According to an operation for controlling the braking negative pressure, the amount of the air flowing through the negative pressure is control valve 51 is increased to a fourth predetermined flow amount, when the braking negative pressure of the brake booster 35 is changed from the first predetermined negative pressure "PB1" (for example, −250 mmHg) to the side of the atmospheric pressure (0 mmHg). The above fourth predetermined flow amount is set in accordance with the engine operational condition. When the braking negative pressure of the brake booster 35 comes back to the second predetermined negative pressure "PB2" (for example, −300 mmHg), which is lower than the first predetermined negative pressure "PB1", the air flow of the air flowing through the negative pressure control valve 51 is cut off. As above, the necessary braking negative pressure is obtained by changing the air flow of the air flowing through the negative pressure control valve 51, with hysteresis, between the fourth predetermined flow amount and zero, so that the braking negative pressure of the brake booster 35 is controlled within a target range between the first and second predetermined negative pressures "PB1" and "PB2".

A process, which is carried out by the ECU 41 in accordance with the programs for the braking negative pressure shown in FIGS. 17 and 18, will be explained. The process of the program is repeatedly carried out at a predetermined cycle (e.g. at a frequency of 128 ms) during an engine operation. When the process of the program starts, the current engine rotational speed, the engine load ratio, and the braking negative pressure, which are respectively detected by the sensors, are read at a step 401. At a step 402, the ECU 41 calculates a basic duty in accordance with the current engine rotational speed and engine load ratio, based on a map shown in FIG. 19 for the basic duty for the negative pressure control valve 51. The basic duty corresponds to a driving duty for the negative pressure control valve 51 under a standard condition, in which an influence of the air flowing through the negative pressure control valve 51 is not taken into consideration. In the map shown in FIG. 19 for the basic duty for the negative pressure control valve 51, the basic duty becomes larger as the engine rotational speed becomes higher and/or the engine load ratio becomes higher, so that the amount of the air (the fourth predetermined flow amount) flowing through the negative pressure control valve 51 is increased.

Then, the process goes to a step 403, at which the ECU 41 calculates a negative pressure correcting coefficient in accordance with the current braking negative pressure, based on a map for a negative pressure correcting coefficient shown in (b) of FIG. 20. The negative pressure correcting coefficient is a coefficient for correcting the amount of the air (the driving duty) flowing through the negative pressure control valve 51 depending on the current braking negative pressure.

At a next step 404, the ECU 41 determines whether the current braking negative pressure is changed from the first predetermined negative pressure "PB1" (e.g. −250 mmHg) to the side of the atmospheric pressure (0 mmHg). When it is the case, the process goes to a step 405, at which the ECU 41 calculates again the negative pressure correcting coefficient in accordance with the current braking negative pressure, which has been changed from the first predetermined negative pressure "PB1" to the side of the atmospheric pressure, based on the map for the negative pressure correcting coefficient shown in (a) of FIG. 20. When the ECU 41 determines at the step 404 that the current braking negative pressure is not changed from the first predetermined negative pressure 'PB1' to the side of the atmospheric pressure, the negative pressure correcting coefficient calculated at the step 403 is used.

Then, the process goes to a step 408, at which the ECU 41 calculates the driving duty for the negative pressure control valve 51, in accordance with the following formula:

"the driving duty for the negative pressure control valve 51=the basic duty×negative pressure correcting coefficient"

In the above formula, the driving duty is guarded such that the driving duty does not go beyond 100%.

The amount of the air flowing through the negative pressure control valve 51 is controlled by the above driving duty for the negative pressure control valve 51. When calculating the driving duty for the negative pressure control valve 51, both of or either one of the oil temperature correcting duty and the ambient temperature correcting duty may be added, as in the same manner to the first embodiment.

At a next step 409, the ECU 41 calculates a correction amount for an opening degree (THB deg) of the throttle valve 19 in accordance with the following formula:

"$THB$=the driving duty for the negative pressure control valve 51×$K2$"

In the above formula, K2 is a conversion factor for converting the driving duty for the negative pressure control valve 51 (the amount of the air flowing through the negative pressure control valve 51) into the correction amount for the opening degree of the throttle valve 19.

Then, the process goes to a step 410 shown in FIG. 13, at which the ECU 41 determines whether an execution flag 1 for the control of the braking negative pressure (the duty control for the negative pressure control valve 51) is turned on. When the execution flag 1 is turned off at the step 410, the ECU 41 determines that the necessary braking negative pressure is obtained, namely that it is not necessary to carry out the control for the braking negative pressure. Then, the process goes to a step 411, at which the ECU 41 sets the driving duty for the negative pressure control valve 51 at "zero" to move (or hold) the negative pressure control valve 51 to its closed position, so that the amount of the air flowing through the negative pressure control valve 51 becomes zero. In addition, the ECU 41 sets the correction amount for the opening degree (THB deg) of the throttle valve 19 to "zero". Then, the process goes to a step 412.

When the execution flag 1 is turned on, the ECU 41 determines at the step 410 that it is necessary to carry out the control for the braking negative pressure (the duty control for the negative pressure control valve 51). Then, the process directly goes to the step 412, at which the ECU 41 sets the driving duty for the braking negative pressure and the correction amount for the opening degree (THB deg) of the throttle valve 19 to such values, which are respectively calculated at the steps 408 and 409.

In the case that the execution flag 1 is turned off, the ECU 41 sets (maintains), at the step 412, the driving duty for the braking negative pressure and the correction amount for the opening degree (THB deg) of the throttle valve 19 at "zero".

Then, the process goes to a step 413, at which the ECU 41 determines whether the current braking negative pressure is changed from the first predetermined negative pressure "PB1" (e.g. −250 mmHg) to the side of the atmospheric pressure (0 mmHg). When it is the case, the ECU 41 determines that the braking negative pressure is coming short, and the process goes to a step 414 at which the execution flag 1 is turned on. Then, the process goes to a step 415. When the ECU 41 determines that the current braking negative pressure is not changed from the first predetermined negative pressure "PB1" to the side of the atmospheric pressure, at the above step 413, the process goes from the step 413 to the step 415.

At the step 415, the ECU 41 determines whether the braking negative pressure has recovered to the second predetermined negative pressure "PB2" (e.g. −300 mmHg), which is lower than the first predetermined negative pressure "PB1". If it is not the case, the process of the program is terminated. Then, when the braking negative pressure has recovered to become lower than the second predetermined negative pressure "PB2" (the determination of the step 415 is YES), the ECU 41 determines that the braking negative pressure is sufficiently obtained. The process goes to a step 416, at which the ECU 41 sets the execution flag 1 (for carrying out the duty control for the negative pressure control valve 51 in the case of shortage of the braking negative pressure) to an OFF state. And the process of the program is terminated.

Even in the above explained second embodiment, the braking negative pressure for the brake booster 35 can be reduced to such a negative pressure, which corresponds to a target negative pressure, as in the similar manner to the first embodiment.

Third Embodiment

Figure 21:
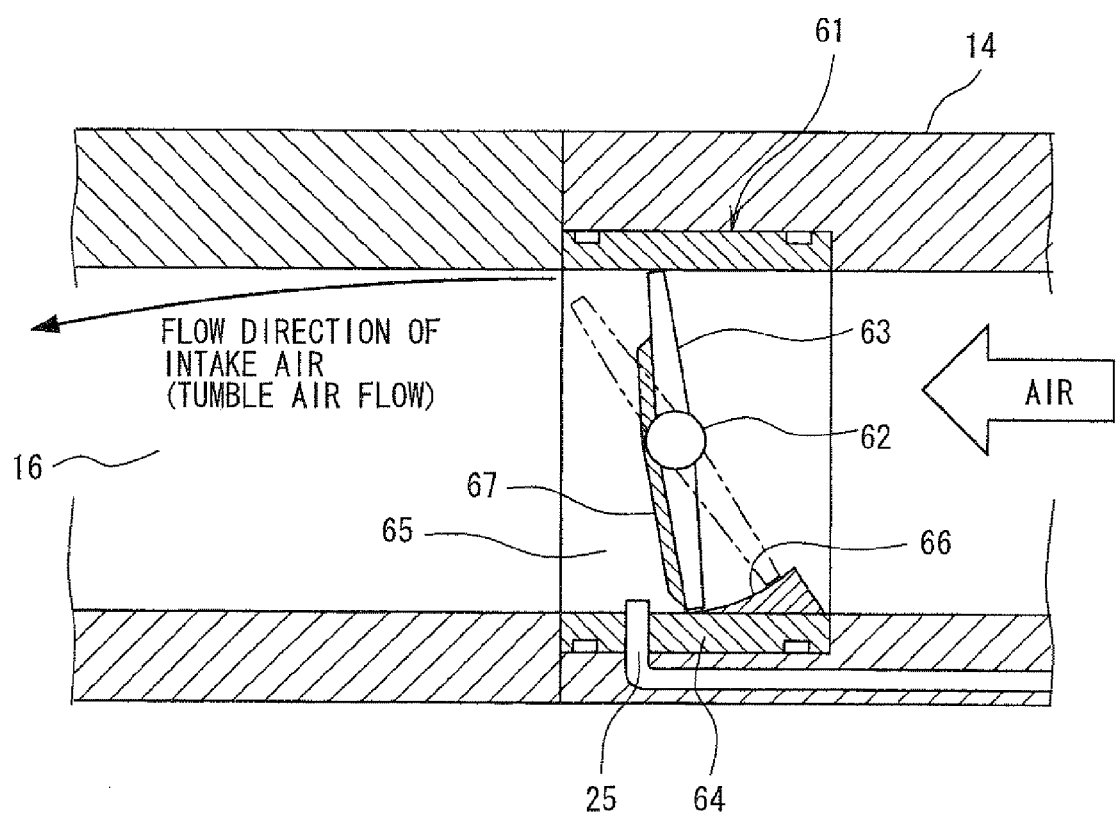
FIG. 21 is a vertical sectional view showing a structure of a throttle valve unit of a butterfly-valve type and its related portions of a third embodiment.

In the above explained first and second embodiments, the cantilever type throttle valve 19 is used, wherein the throttle valve 19 has the shaft 20 at the lower side of the throttle valve unit is. According to the third embodiment shown in FIG. 21, however, a throttle valve 63 of a butterfly-valve type is used, wherein the throttle valve 63 has a shaft 62 at a center of a throttle valve unit 61.

In the third embodiment, a bore 66 of a spherical surface is formed at a lower surface of an air passage 65 of a housing 64 for the throttle valve unit 61, wherein the shape of the bore 66 (the spherical surface) is so formed to correspond to a shape of a lower end of the throttle valve 63. Accordingly, a space (a gap) between the lower end of the throttle valve 63 and the lower surface of the air passage 65 is closed by the bore 66, when the throttle valve 63 is in a predetermined opening degree (for example, 20 degrees) from its fully closed position. As a result, an air flow of the intake air is formed only at an upper end of the throttle valve 63 (between the upper end of the throttle valve 63 and an inner surface of the housing 64), so that the tumble air flow is generated at a downstream side of the throttle valve 63 by the air flow of the intake air passing over the upper end of the throttle valve 63.

When the shape of the throttle valve 63 (at least the lower end thereof) is circular, as in the third embodiment, the shape of the bore 66 is formed by the spherical surface. In the case that the shape of the lower end of the throttle valve 63 is straight, the shape of the bore 66 is formed by an arc shaped surface. As above, the shape of the bore 66 is formed by any surface, which corresponds to the shape of the lower end of the throttle valve 63.

According to the third embodiment, a PTC heater 67 which has a self temperature control function is also provided at the back surface of each throttle valve 63. The back surface of the throttle valve 63, the inner surface of the air passage 65 of such a side (a lower side) at which no air flow is generated when the throttle valve 63 is slightly opened, and the shaft 62 of the throttle valve 63 are heated by the PTC heater 67.

Each of the communication passages 25 for the respective cylinders is connected to the air passage 65 adjacent to the back surface of the throttle valve 63 on the side of the intake port 16. Namely the communication passage 25 is connected to the air passage 65 on the side (the lower side in the third embodiment) in which air flow is not generated when the throttle valve 63 is slightly opened. More exactly, the open end of the communication passage 25 is directed to the throttle valve 63. The other structure is the same to the above first or second embodiment.

In the above third embodiment, the same advantages to the first or second embodiment can be obtained.

In the above first to third embodiments, the PTC heater 38 or 67 may be removed.

The present invention is applied to the four cylinder engine in the above first to third embodiments. However, the present invention can be applied to a two cylinder engine, a three cylinder engine, or any other engines having more than five cylinders.

Furthermore, in the above first to third embodiments, the present invention is applied to such an engine in which fuel is injected into the intake port. The present invention can be applied to such an engine in which fuel is injected directly into a cylinder, or to such a dual injection type engine in which injectors are provided for the cylinders and for the intake ports.

Furthermore, the way of controlling the negative control valves 33 and 51, as well as the structure thereof may be modified according to necessity.

What is claimed is:

1. A negative braking pressure control apparatus comprising:
   a main intake air passage, which is branched into intake manifolds for supplying intake air into respective cylinders;
   a respective throttle valve provided in each of the intake manifolds for respectively controlling an intake air amount;
   a respective communication passage connected to each of the intake manifolds at a downstream side of the throttle valve, in order to generate a negative braking pressure for a brake booster;
   a negative pressure control valve provided in a negative pressure pipe, wherein the communication passages for the respective cylinders are converged to the negative pressure pipe;

a negative pressure control means for operating the negative pressure control valve and thereby controlling the negative braking pressure of the brake booster in accordance with an operational condition of the engine;

an air ejector provided in the negative pressure pipe;

a negative pressure passage for the brake booster, wherein the brake booster connected to a suction side of the air ejector via the negative pressure passage, and wherein the negative pressure passage includes a check valve;

a gas passage for crankcase ventilating gas, which is connected at a driving gas side of the air ejector; and a branched intake air passage connected at the driving gas side of the air ejector for distributing a part of the intake air in the main intake air passage upstream of the throttle valve, wherein the negative pressure control valve is provided in the intake air branched passage.

2. A negative braking pressure control apparatus according to claim 1, wherein an open end of at least one of the communication passages is directed to a back surface of the respective throttle valve on a side of an intake port.

3. A negative braking pressure control apparatus according to claim 2, further comprising:

a heater for heating the back surface of the throttle valve and an inner surface of the air passage.

4. A negative braking pressure control apparatus according to claim 3, wherein the heater is provided at the back surface of the throttle valve.

5. A negative braking pressure control apparatus according to claim 3, further comprising:

an ambient temperature detecting sensor for detecting ambient temperature; and a heater control unit for supplying electric current to the heater during a period from a time point at which an engine operation starts to a time point at which the engine is warmed-up, when the ambient temperature detected by the ambient temperature detecting sensor is lower than a predetermined temperature, wherein the heater control unit supplies the electric current to the heater during a period from a time point of a vehicle deceleration to a time point of an engine idling operation, even when the engine is warmed-up.

6. A negative braking pressure control apparatus according to claim 4, wherein the negative pressure control means controls an amount of intake air flowing through the negative pressure control valve in accordance with the operational condition of the engine during a period in which the electric current is supplied to the heater.

7. A negative braking pressure control apparatus according to claim 1, further comprising:

an intake air amount control means for decreasing an amount of the intake air passing through the throttle valve by an amount which corresponds to an amount of air flowing through the negative pressure control valve, wherein the negative pressure control means increases the amount of air flowing through the negative pressure control valve to a first predetermined flow amount, which is defined according to the operational condition of the engine, when the negative braking pressure of the brake booster is changed from a first predetermined negative pressure toward the atmospheric pressure, and the negative pressure control means cuts off the flow of air flowing through the negative pressure control valve, when the negative braking pressure of the brake booster recovers to a second predetermined negative pressure, which is lower than the first predetermined negative pressure.

8. A negative braking pressure control apparatus according to claim 7, wherein the negative pressure control means defines the first predetermined flow amount such that the first predetermined flow amount decreases as a rotational speed of the engine decreases relative to a selected engine load and rotational speed, and such that the first predetermined flow amount decreases as an engine load decreases relative to a selected engine load and rotational speed.

9. A negative braking pressure control apparatus according to claim 7, wherein the negative pressure control means controls the amount of air flowing through the negative pressure control valve at a second predetermined flow amount, which is defined according to a temperature of the engine, when the engine is not yet completely warmed-up even in the case that the braking negative pressure of the brake booster becomes lower than the second predetermined negative pressure.

10. A negative braking pressure control apparatus according to claim 9, wherein the negative pressure control means defines the second predetermined flow amount such that the second predetermined flow amount increases as the temperature of the engine decreases.

\* \* \* \* \*